US009381956B2

(12) United States Patent
Kishima et al.

(10) Patent No.: US 9,381,956 B2
(45) Date of Patent: Jul. 5, 2016

(54) VEHICLE BODY FRONT STRUCTURE

(71) Applicant: TOYOTA JIDOSHA KABUSHIKI KAISHA, Toyota-shi, Aichi-ken (JP)

(72) Inventors: Fumihiko Kishima, Konan (JP); Kazuhiro Maeda, Miyoshi (JP); Kazuya Koizumi, Iwata (JP); Taro Yamashita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/428,277

(22) PCT Filed: Aug. 26, 2013

(86) PCT No.: PCT/JP2013/072756
§ 371 (c)(1),
(2) Date: Mar. 13, 2015

(87) PCT Pub. No.: WO2014/041997
PCT Pub. Date: Mar. 20, 2014

(65) Prior Publication Data
US 2015/0246697 A1    Sep. 3, 2015

(30) Foreign Application Priority Data

Sep. 14, 2012  (JP) ................................ 2012-202894

(51) Int. Cl.
*B62D 35/00* (2006.01)
*B62D 25/16* (2006.01)
(Continued)

(52) U.S. Cl.
CPC .............. *B62D 35/00* (2013.01); *B62D 25/025* (2013.01); *B62D 25/16* (2013.01); *B62D 35/02* (2013.01)

(58) Field of Classification Search
CPC ...... B62D 35/00; B62D 35/005; B62D 35/02; B62D 25/16; B62D 25/08; B62D 37/02
USPC ........................................ 296/180.1, 208, 198
See application file for complete search history.

(56) References Cited

U.S. PATENT DOCUMENTS 4,460,055 A * 7/1984 Steiner .................. B62D 35/00
                                                    180/7.1
4,549,762 A * 10/1985 Burk ...................... B60K 11/08
                                                    180/68.1

(Continued)

FOREIGN PATENT DOCUMENTS

JP     H05-64071 U    8/1993
JP     H06-227436 A   8/1994

(Continued)

*Primary Examiner* — Gregory Blankenship
(74) *Attorney, Agent, or Firm* — Oliff PLC

(57) ABSTRACT

In a vehicle to which a vehicle body front structure is applied, an opening portion is formed behind a rear end portion of an arch portion. The opening portion is held in communication with an air flow passage, and is opened backward with respect to the vehicle. Then, the air caused to flow into the air flow passage during traveling of the vehicle flows from a front side toward a rear side with respect to the vehicle, and is discharged from the opening portion backward with respect to the vehicle. Thus, the air current blown out from the air flow passage to an outside of the wheel house in a vehicle width direction via the wheel house is restrained from being produced. Therefore, the traveling wind flowing outside the wheel house in the vehicle width direction is restrained from hitting the air current.

8 Claims, 20 Drawing Sheets

(51) Int. Cl.
   *B62D 35/02*   (2006.01)
   *B62D 25/02*   (2006.01)

(56) References Cited

U.S. PATENT DOCUMENTS

| | | | | |
|---|---|---|---|---|
| 4,640,541 | A | * | 2/1987 | FitzGerald ........... B62D 35/001 280/851 |
| 5,419,608 | A | * | 5/1995 | Takemoto ................ B60G 3/00 180/903 |
| 5,820,203 | A | * | 10/1998 | Morelli ................... B60C 23/18 180/903 |
| 6,719,359 | B2 | * | 4/2004 | Steinicke ............... B62D 35/00 180/903 |
| 8,276,971 | B2 | * | 10/2012 | Hirano ................... B62D 25/16 180/903 |
| 2003/0160472 | A1 | * | 8/2003 | Xia ........................ B60K 13/02 296/65.09 |
| 2006/0238001 | A1 | | 10/2006 | Konermann et al. |
| 2008/0231082 | A1 | * | 9/2008 | Mathew ............... B62D 25/161 296/198 |
| 2010/0090503 | A1 | * | 4/2010 | Uchino ................ B62D 25/161 296/198 |
| 2010/0156142 | A1 | * | 6/2010 | Sumitani .............. B62D 25/161 296/180.1 |
| 2011/0001334 | A1 | * | 1/2011 | Hirano ................... B62D 35/00 296/180.1 |
| 2014/0375081 | A1 | * | 12/2014 | Kuriyama .............. B62D 25/16 296/187.1 |
| 2015/0246697 | A1 | * | 9/2015 | Kishima ................ B62D 25/16 296/180.1 |

FOREIGN PATENT DOCUMENTS

| | | |
|---|---|---|
| JP | H08-324462 A | 12/1996 |
| JP | H10-152017 A | 6/1998 |
| JP | 2000-177649 A | 6/2000 |
| JP | 2006-505439 A | 2/2006 |
| JP | 2006-298269 A | 11/2006 |
| JP | 2008503232 | 6/2008 |
| JP | 2010-047231 A | 3/2010 |
| JP | 2010-255433 A | 11/2010 |
| WO | 2007/119270 A1 | 10/2007 |

* cited by examiner

F I G . 3
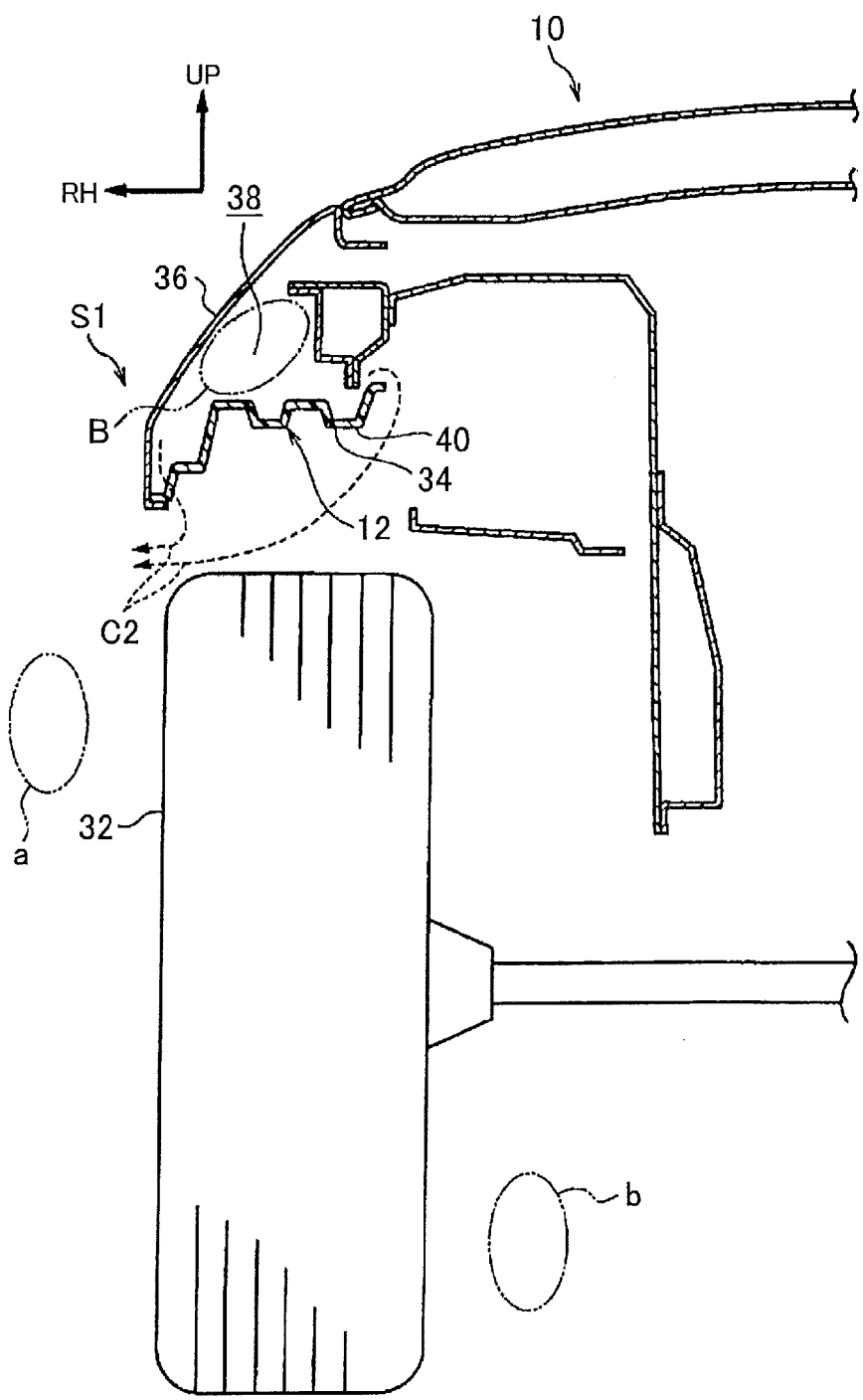

VEHICLE BODY FRONT STRUCTURE

TECHNICAL FIELD

The invention relates to a vehicle body front structure that is equipped with a fender liner.

BACKGROUND ART

A fender liner described in Patent Document 1 shown below is configured to include an arch portion that is formed along a wheel house, an introduction port that is provided at a front end portion of the arch portion, and an exhaust port that is provided at a rear end portion of the arch portion. Besides, the fender liner has a hollow portion through which the air caused to flow into the introduction port is introduced to the exhaust port. The hollow portion is held in communication with the interior of the wheel house by a plurality of suction holes that are formed through the arch portion.

Then, during traveling of a vehicle, air is caused to flow into the hollow portion from the introduction port, the air in the wheel house is sucked from the suction holes into the hollow portion, and the air in the hollow portion flows backward with respect to the vehicle to be discharged from the exhaust port.

RELATED ART DOCUMENTS

Patent Documents

Patent Document 1: Japanese Patent Application Publication No. 2010-047231 (JP 2010-047231 A)
Patent Document 2: Japanese Utility Model Application Publication No. 5-64071 (JP 5-64071 U)
Patent Document 3: Japanese Patent Application Publication No. 2010-255433 (JP 2010-255433 A)
Patent Document 4: Published Japanese Translation of PCT Application No. 2006-505439 (JP 2006-505439 A)

SUMMARY OF THE INVENTION

Problem to Be Solved by the Invention

However, with this fender liner, the plurality of the suction holes are formed through the arch portion as described above, so the air in the hollow portion may be blown out from the suction holes toward the wheel house side during traveling of the vehicle. In this case, an air current blown out from the hollow portion outward of the wheel house in a vehicle width direction via the wheel house is produced. This air current hits a traveling wind flowing backward with respect to the vehicle outside the wheel house in the vehicle width direction, so the traveling wind may become turbulent. Therefore, there is room for improvement in achieving good operating stability of the vehicle.

In consideration of the aforementioned fact, it is an object of the invention to provide a vehicle body front structure that can achieve good operating stability of a vehicle.

Means for Solving the Problem

A vehicle body front structure according to a first aspect of the invention is equipped with a fender liner that is provided in a wheel house in which a front wheel is arranged, that has an arch portion covering an upper portion of the front wheel from a vehicle upper side, and that forms an air flow passage between the arch portion and a fender, a communication passage through which a front grill that is provided at a vehicle front portion and the air flow passage communicate with each other, and an opening portion that is provided behind a rear end portion of the arch portion with respect to a vehicle, that is held in communication with the air flow passage, that is opened backward with respect to the vehicle, and that discharges air caused to flow into the air flow passage to a space below a floor that is located behind the front wheel with respect to the vehicle.

In the vehicle body front structure according to the first aspect of the invention, the fender liner is provided in the wheel house in which the front wheel is arranged. This fender liner has the arch portion, and the upper portion of the front wheel is covered with the arch portion from the vehicle upper side. Then, the air flow passage is formed between this arch portion and the fender. This air flow passage is held in communication with the front grill through the communication passage. Thus, the air that has passed the front grill backward with respect to the vehicle during traveling of the vehicle flows to the air flow passage via the communication passage.

It should be noted herein that the opening portion is formed behind the rear end portion of the arch portion with respect to the vehicle, and that the opening portion is held in communication with the air flow passage and is opened backward with respect to the vehicle. Then, the air caused to flow into the air flow passage from the front grill via the communication passage during traveling of the vehicle is discharged from the opening portion to the space below the floor that is located behind the front wheel with respect to the vehicle. That is, the air current that mainly flows backward with respect to the vehicle is produced in the air flow passage, so the air in the air flow passage is restrained from being blown out toward the wheel house side. Thus, the air current that is blown out from the air flow passage to the outside of the wheel house in the vehicle width direction via the wheel house is restrained from being produced. Accordingly, the traveling wind that flows backward with respect to the vehicle outside the wheel house in the vehicle width direction is restrained from hitting the air current that is blown out from the wheel house outward in the vehicle width direction. Therefore, the traveling wind can be restrained from becoming turbulent.

Besides, the opening portion is opened backward with respect to the vehicle, so the air discharged from the opening portion to the space below the floor that is located behind the front wheel with respect to the vehicle flows backward with respect to the vehicle. That is, the air current flowing from the opening portion backward with respect to the vehicle is produced. Thus, the orientation of the traveling wind flowing backward with respect to the vehicle below the opening portion with respect to the vehicle substantially coincides with the orientation of this air current. Thus, the air in the air flow passage is efficiently discharged from the opening portion.

A vehicle body front structure according to a second aspect of the invention is obtained by modifying the vehicle body front structure according to the first aspect of the invention such that no hole for causing air to flow into the air flow passage from inside the wheel house is formed through the arch portion.

In the vehicle body front structure according to the second aspect of the invention, no hole for causing air to flow into the air flow passage from inside the wheel house is formed through the arch portion. Therefore, the air current that is blown out from inside the air flow passage outward of the wheel house in the vehicle width direction via the wheel house can be more restrained from being produced. Besides, no hole for causing air to flow from inside the wheel house into the air flow passage is formed through the arch portion.

Therefore, surplus air is restrained from entering the air flow passage from inside the wheel house. Thus, the air in the air flow passage can be efficiently discharged from the opening portion.

A vehicle body front structure according to a third aspect of the invention is obtained by modifying the vehicle body front structure according to the first or second aspect of the invention such that an inclined portion is provided in front of the opening portion with respect to the vehicle, and that the inclined portion constitutes part of a rear end portion of the wheel house in which the front wheel is arranged, and is inclined backward and downward with respect to the vehicle in a lateral view.

In the vehicle body front structure according to the third aspect of the invention, the inclined portion is provided in front of the opening portion with respect to the vehicle. This inclined portion constitutes part of the rear end portion of the wheel house, and is inclined downward and backward with respect to the vehicle in a lateral view. Thus, for example, when the traveling wind flowing backward with respect to the vehicle in the wheel house toward the rear end portion of the wheel house during traveling of the vehicle hits the inclined portion, this traveling wind flows backward with respect to the vehicle along the inclined portion. Therefore, this traveling wind is restrained from moving upward with respect to the vehicle along the arch portion. Accordingly, the air current in the wheel house is restrained from becoming turbulent, so the operating stability of the vehicle can be further improved.

A vehicle body front structure according to a fourth aspect of the invention is obtained by modifying the vehicle body front structure according to any one of the first to third aspects of the invention such that a protrusion portion that is protruded upward with respect to the vehicle is formed on an edge portion of the opening portion that is located on a lower side with respect to the vehicle.

In the vehicle body front structure according to the fourth aspect of the invention, the protrusion portion is formed on the edge portion of the opening portion that is located on the lower side with respect to the vehicle, and the protrusion portion is protruded from the edge portion upward with respect to the vehicle. Thus, a swirl is produced behind the protrusion portion with respect to the vehicle, and the traveling wind flowing backward with respect to the vehicle below the opening portion with respect to the vehicle is drawn in upward with respect to the vehicle (toward the opening portion side) by the swirl. Accordingly, the air discharged from the opening portion by the traveling wind thus drawn in can be efficiently caused to flow backward with respect to the vehicle.

A vehicle body front structure according to a fifth aspect of the invention is obtained by modifying the vehicle body front structure according to any one of the first to fourth aspects of the invention such that a rocker that is provided at a lower portion of the vehicle and behind the fender liner with respect to the vehicle and a rocker molding that covers the rocker are further provided, and that the opening portion is formed through the rocker molding.

In the vehicle body front structure according to the fifth aspect of the invention, the rocker is provided at the lower portion of the vehicle and behind the fender liner with respect to the vehicle. The rocker is covered with the rocker molding. It should be noted herein that the opening portion is formed through the rocker molding. Thus, the air caused to flow into the air flow passage with the aid of the rocker molding can be discharged backward with respect to the vehicle.

A vehicle body front structure according to a sixth aspect of the invention is obtained by modifying the vehicle body front structure according to any one of the first to fifth aspects of the invention such that a guide portion that guides air in the air flow passage to the opening portion side is provided behind the arch portion with respect to the vehicle.

In the vehicle body front structure according to the sixth aspect of the invention, the guide portion is provided behind the arch portion with respect to the vehicle, and the air in the air flow passage is guided toward the opening portion side by the guide portion. Therefore, the air in the air flow passage can be efficiently introduced to the opening portion.

A vehicle body front structure according to a seventh aspect of the invention is obtained by modifying the vehicle body front structure according to the sixth aspect of the invention such that a guide wall that extends in a vehicle longitudinal direction in a plan view is formed on the guide portion, and that the guide wall is manufactured from a fiber-reinforced composite material.

In the vehicle body front structure according to the seventh aspect of the invention, the guide wall that extends in the longitudinal direction of the vehicle in the plan view is formed on the guide portion, and the guide wall is manufactured from the fiber-reinforced composite material. Therefore, the collision load input to the vehicle can be absorbed by the guide wall in the event of, for example, a minimal wrap collision of the vehicle (when the vehicle collides head-on with a collision body such as an oncoming vehicle or the like outside a front side member of the vehicle in the vehicle width direction).

A vehicle body front structure according to an eighth aspect of the invention is obtained by modifying the vehicle body front structure according to any one of the first to seventh aspects of the invention such that the arch portion is formed in a convexo-concave shape in a cross-sectional view as viewed from a circumferential direction of the arch portion.

In the vehicle body front structure according to the eighth aspect of the invention, a lateral wall of the air flow passage on the arch portion side is formed in the convexo-concave shape in the cross-sectional view as viewed from the circumferential direction of the arch portion. Thus, part of the air current in the air flow passage tends to flow along the circumferential direction of the arch portion that assumes the convexo-concave shape, so the air in the air flow passage is further restrained from being blown out toward the wheel house side.

Effects of the Invention

With the vehicle body front structure according to the first aspect of the invention, good operating stability of the vehicle can be achieved.

With the vehicle body front structure according to the second aspect of the invention, the operating stability of the vehicle can be further improved.

With the vehicle body front structure according to the third aspect of the invention, the operating stability of the vehicle can be further improved.

With the vehicle body front structure according to the fourth aspect of the invention, the air discharged from the opening portion can be efficiently caused to flow backward with respect to the vehicle.

With the vehicle body front structure according to the fifth aspect of the invention, the air caused to flow into the air flow passage with the aid of the rocker molding can be discharged backward with respect to the vehicle.

With the vehicle body front structure according to the sixth aspect of the invention, the air caused to flow into the air flow passage can be efficiently introduced to the opening portion.

With the vehicle body front structure according to the seventh aspect of the invention, the collision load input to the vehicle in the event of a minimal wrap collision of the vehicle can be absorbed by the guide wall.

With the vehicle body front structure according to the eighth aspect of the invention, the air in the air flow passage can be further restrained from being blown out toward the wheel house side.

BRIEF DESCRIPTION OF THE DRAWINGS

FIG. 3 is a partially broken cross-sectional view of a wheel house shown in FIG. 2, as viewed from a vehicle front side (a cross-sectional view taken along a line 3-3 of FIG. 2).

Figure 1A:
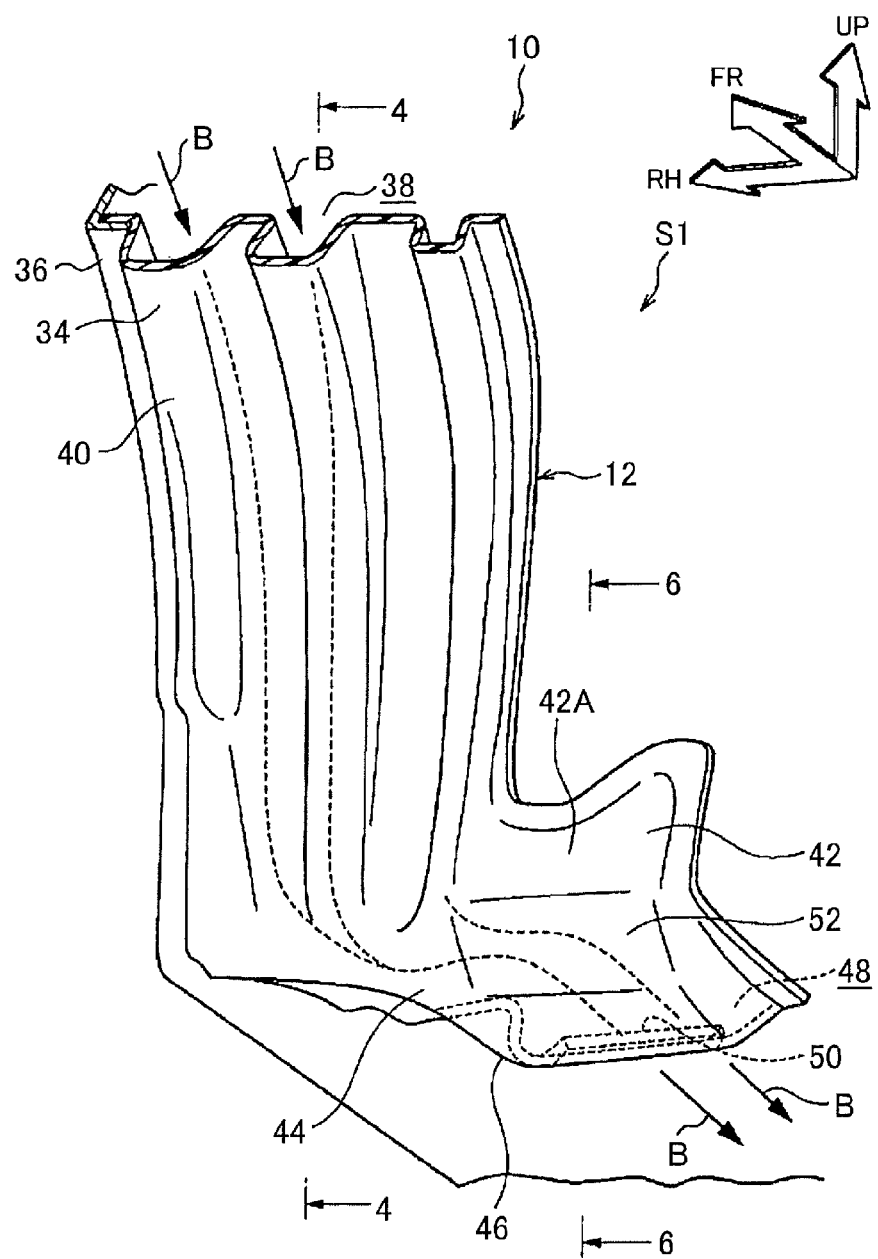
FIG. 1A is a partially broken enlarged perspective view of a rear portion of a fender liner that is employed for a vehicle body front structure according to a first embodiment of the invention, as viewed from a point diagonally in front of and below a vehicle (an enlarged view of a region 1A of FIG. 1B).

MODES FOR CARRYING OUT THE INVENTION (First Embodiment)

The first embodiment of the invention will be described using FIGS. 1A to 8. Besides, in the following description, a front portion of a vehicle 10 to which a vehicle body front structure S1 according to the first embodiment of the invention is applied will be described first, and then a fender liner 12 as an essential part of the invention will be described. Incidentally, in the drawings, a vehicle forward direction is indicated by an arrow FR, a vehicle rightward direction (toward one side in a vehicle width direction) is indicated by an arrow RH, and a vehicle upward direction is indicated by an arrow UP. Besides, the vehicle body front structure S1 is symmetrically configured in the vehicle width direction. Therefore, the vehicle body front structure S1 on the right side of the vehicle will be described, and the description of the vehicle body front structure S1 on the left side of the vehicle will be omitted.

(With Regard to Front Portion of Vehicle 10)

Figure 2:
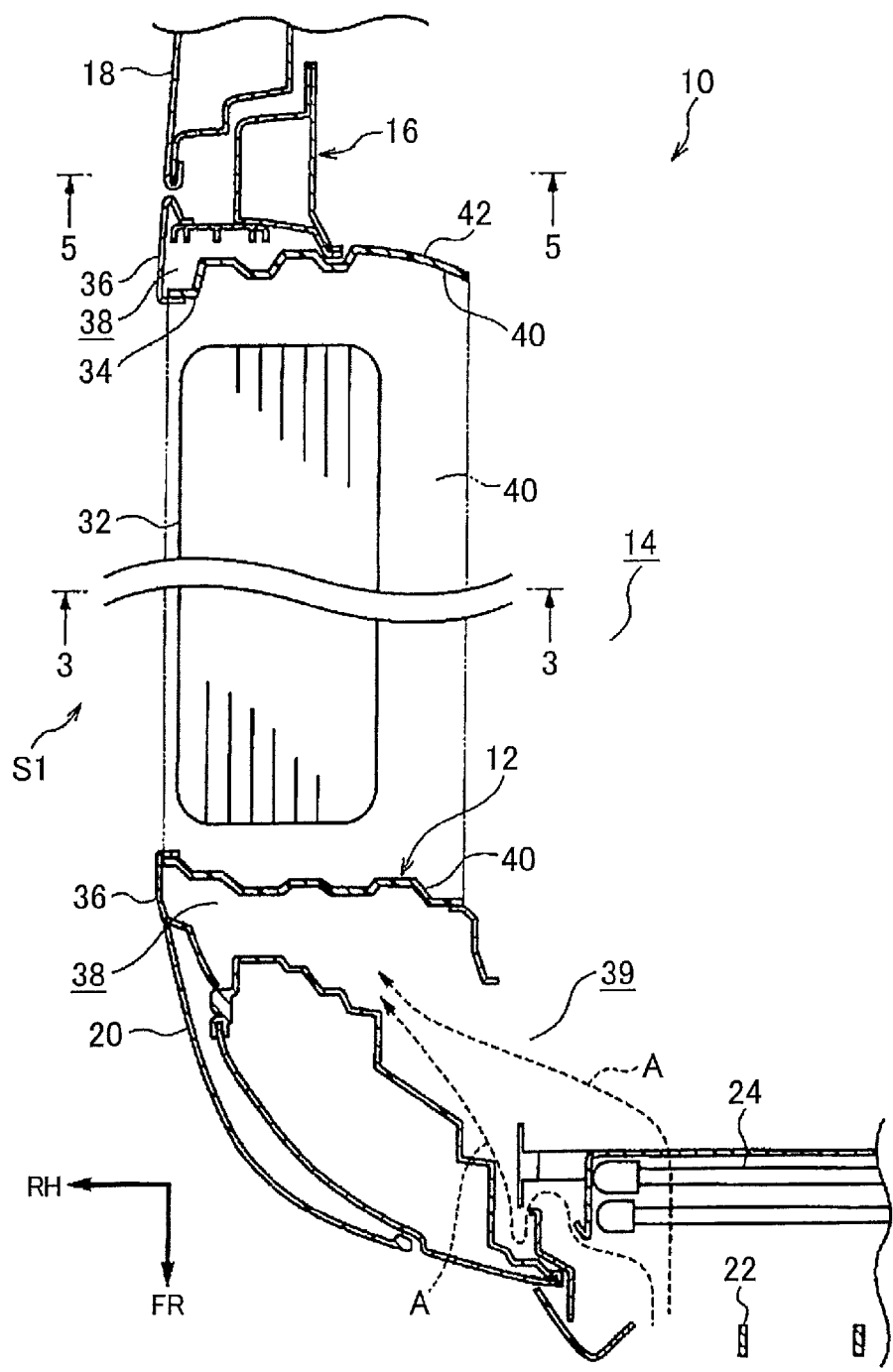
FIG. 2 is a cross-sectional view showing a front portion of the vehicle to which the vehicle body front structure according to the first embodiment of the invention is applied, as viewed from above the vehicle.
Figure 4:
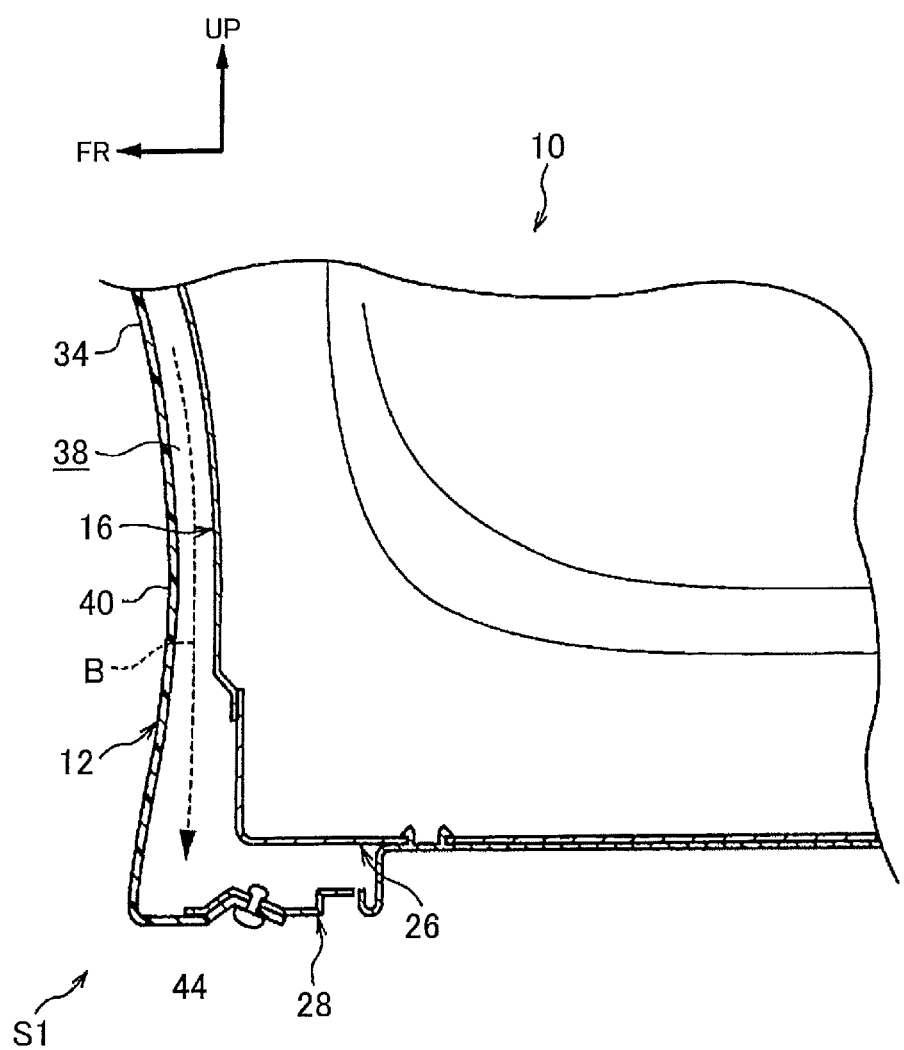
FIG. 4 is a cross-sectional view showing a rear portion of the fender liner shown in FIG. 1A, as viewed from a vehicle left side (a cross-sectional view taken along a line 4-4 of FIG. 1A).

FIG. 2 is a cross-sectional view showing the front portion of the vehicle 10 to which the vehicle body front structure S1 is applied, as viewed from above the vehicle. As shown in this drawing, the vehicle 10 is equipped with the fender liner 12, and the fender liner 12 is arranged outside an engine room 14 in the vehicle width direction. Then, a front side member (not shown) that extends in a vehicle longitudinal direction is arranged inside the fender liner 12 in the vehicle width direction. Besides, a front pillar 16 extends in a vehicle vertical direction behind the fender liner 12 with respect to the vehicle, and a front door 18 is provided outside the front pillar 16 in the vehicle width direction. Furthermore, a vehicle right end portion of a front bumper 20 that extends in the vehicle width direction is arranged in front of the fender liner 12 with respect to the vehicle. A front grill 22 is attached to this front bumper 20, and a radiator 24 is disposed behind the front grill 22 with respect to the vehicle.

Figure 5:
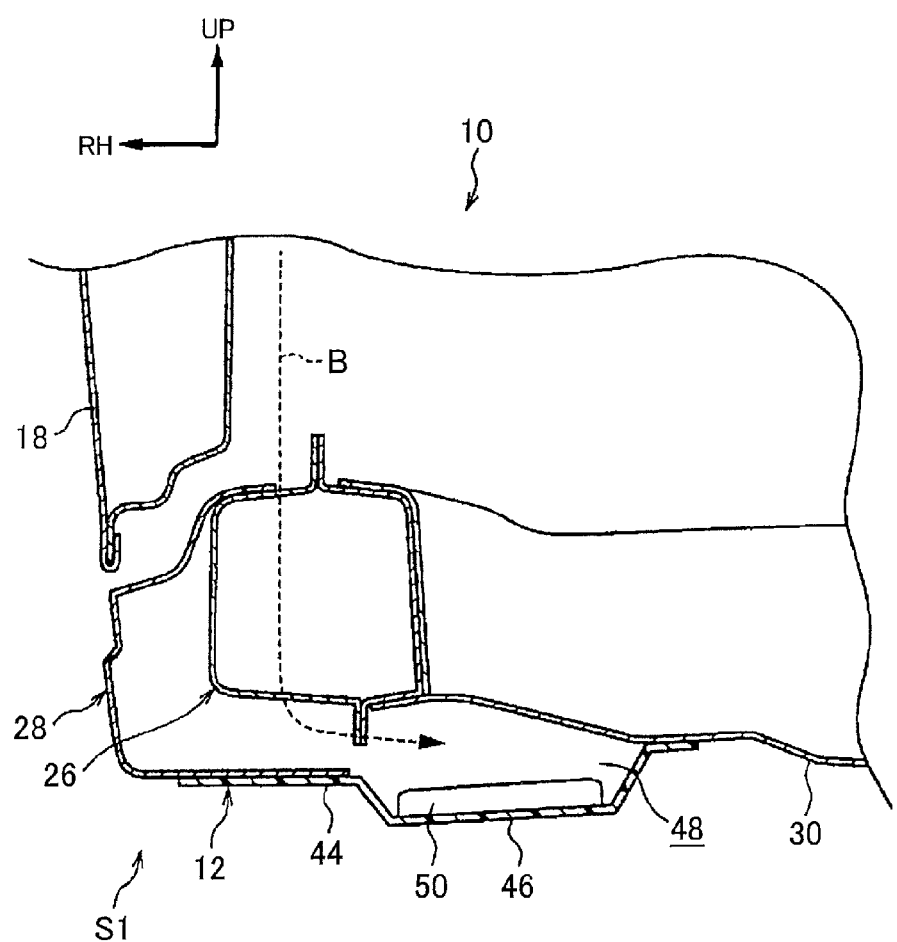
FIG. 5 is a cross-sectional view showing the rear portion of the fender liner shown in FIG. 2, as viewed from the vehicle front side (a cross-sectional view taken along a line 5-5 of FIG. 2).

A lower end portion of the front pillar 16 is linked with a rocker 26 shown in FIG. 5. The rocker 26 has a closed cross-section substantially in the shape of a rectangular ring as viewed from a point in front of the vehicle, and extends in the vehicle longitudinal direction. This rocker 26 is covered with a rocker molding 28. The rocker molding 28 has a substantially U-shaped cross-section that is opened inward in the vehicle width direction as viewed from a point in front of the vehicle, and extends in the vehicle longitudinal direction. Besides, an under reinforcement (not shown) extends in the vehicle longitudinal direction inside the rocker 26 in the vehicle width direction. This under reinforcement is coupled to the rocker 26 by a torque box 30.

(With Regard to Fender Liner 12)

Figure 1B:
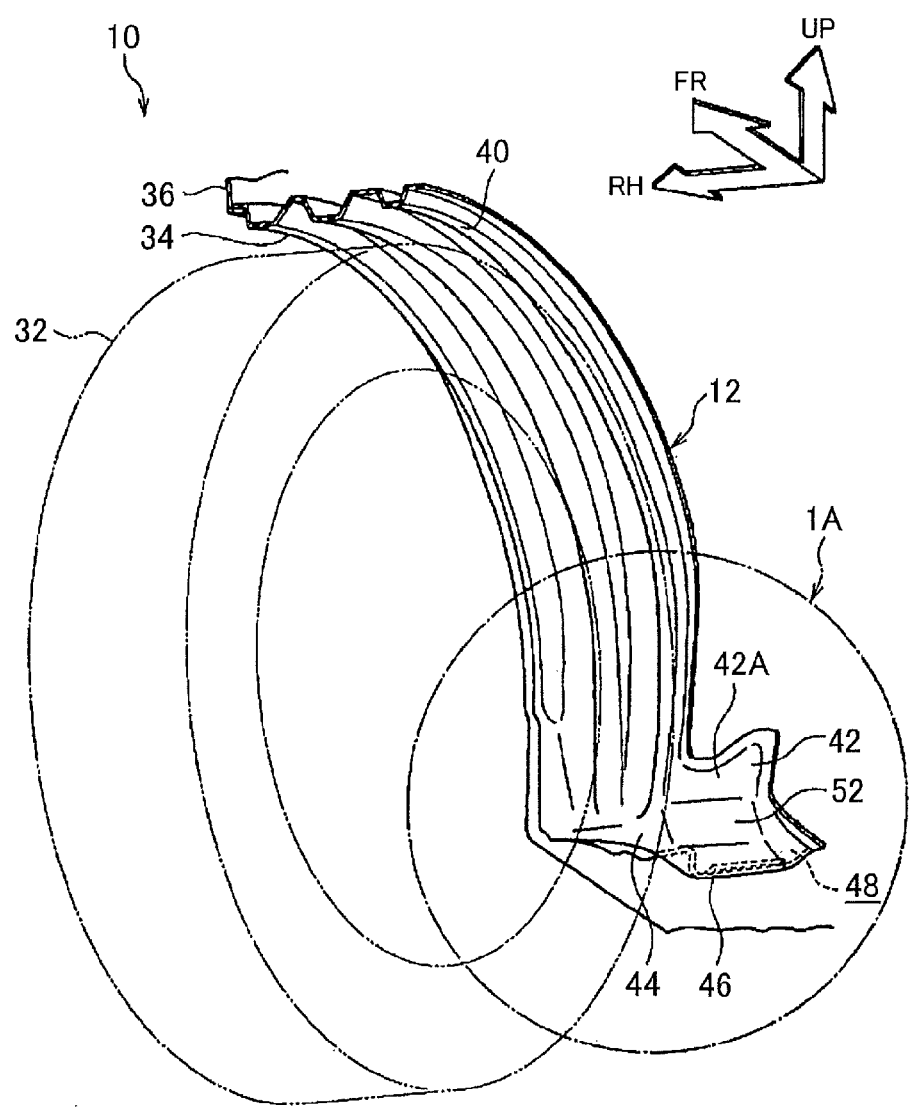
FIG. 1B is a partially broken perspective view showing a vehicle rear-side half of the entire fender liner shown in FIG. 1A, as viewed from a point diagonally in front of and below the vehicle.

As shown in FIG. 1B, the fender liner 12 has an arch portion 40. The arch portion 40 is formed substantially in the shape of a semicircle that is opened downward with respect to the vehicle in a lateral view. Then, as shown in FIG. 3, a front wheel 32 is arranged radially inward of the arch portion 40. The arch portion 40 covers the front wheel 32 from a vehicle upper side in such a manner as to permit the turning of the front wheel 32. Thus, part of a wheel house 34 of the vehicle 10 is constituted by the arch portion 40. Besides, an edge portion of the arch portion 40 that is located outside in the vehicle width direction is linked with a fender panel 36 serving as "a fender" that constitutes a design surface of the vehicle 10. An edge portion of the arch portion 40 that is located inside in the vehicle width direction is linked with a fender apron (not shown).

Besides, a space is formed between the arch portion 40 and the fender panel 36. This space serves as an air flow passage 38. The air flow passage 38 extends from a front end portion of the arch portion 40 to a rear end portion of the arch portion 40 along the arch portion 40. Furthermore, no hole for causing air to flow into the air flow passage 38 from inside the wheel house 34 is formed through the arch portion 40. Besides, the arch portion 40 is formed in a convexo-concave shape in a cross-sectional view as viewed from a circumferential direction of the arch portion 40. This convexo-concave region is extended in the circumferential direction of the arch portion 40.

Then, when the air that has passed the front grill 22 and the radiator 24 is caused to flow into the engine room 14 during traveling of the vehicle 10, this air cannot be completely blocked between the front grill 22 and the air flow passage 38, so an air current (see a dotted arrow A in FIG. 2) flowing toward the air flow passage 38 side is produced. The region passed by this air current serves as a communication passage 39. Thus, the front grill 22 and the air flow passage 38 are held in communication with each other by the communication passage 39.

Besides, as shown in FIGS. 1A and 1B, an attachment strip 42 that constitutes part of the arch portion 40 is integrally formed at the rear end portion of the arch portion 40. The attachment strip 42 is formed substantially in the shape of a rectangular plate, extends from the rear end portion of the arch portion 40 inward in the vehicle width direction, and is linked with a dash panel (not shown) of the vehicle 10. Besides, a recess portion 42A is formed in a substantially central portion of the attachment strip 42. The recess portion 42A is protruded backward with respect to the vehicle, and is opened forward with respect to the vehicle. Incidentally, the attachment strip 42 may dispense with this recess portion 42A.

Furthermore, a rear end portion of the fender liner 12 is flexed backward with respect to the vehicle, thus forming a flange portion 44. The flange portion 44 extends from a rear end of the arch portion 40 backward with respect to the vehicle in a lateral view, and is arranged below the rocker molding 28 and the torque box 30 with respect to the vehicle (see FIG. 5). A bulge portion 46 is formed on an inner region of this flange portion 44 in the vehicle width direction (a lower region of the attachment strip 42 with respect to the vehicle). The bulge portion 46 is caused to bulge downward with respect to the vehicle, and is formed in the shape of a recess that is opened upward with respect to the vehicle as viewed from a point behind the vehicle. Thus, the bulge portion 46 is spaced apart from the torque box 30, and an opening portion 48 that is opened backward with respect to the vehicle is formed between the torque box 30 and the fender liner 12 (the bulge portion 46) (see FIGS. 5 and 6). Then, the interior of the bulge portion 46 and the air flow passage 38 are held in communication with each other, and are configured such that the air in the air flow passage 38 is discharged from the opening portion 48 to a space below a floor that is located behind the front wheel 32 with respect to the vehicle.

Figure 6:
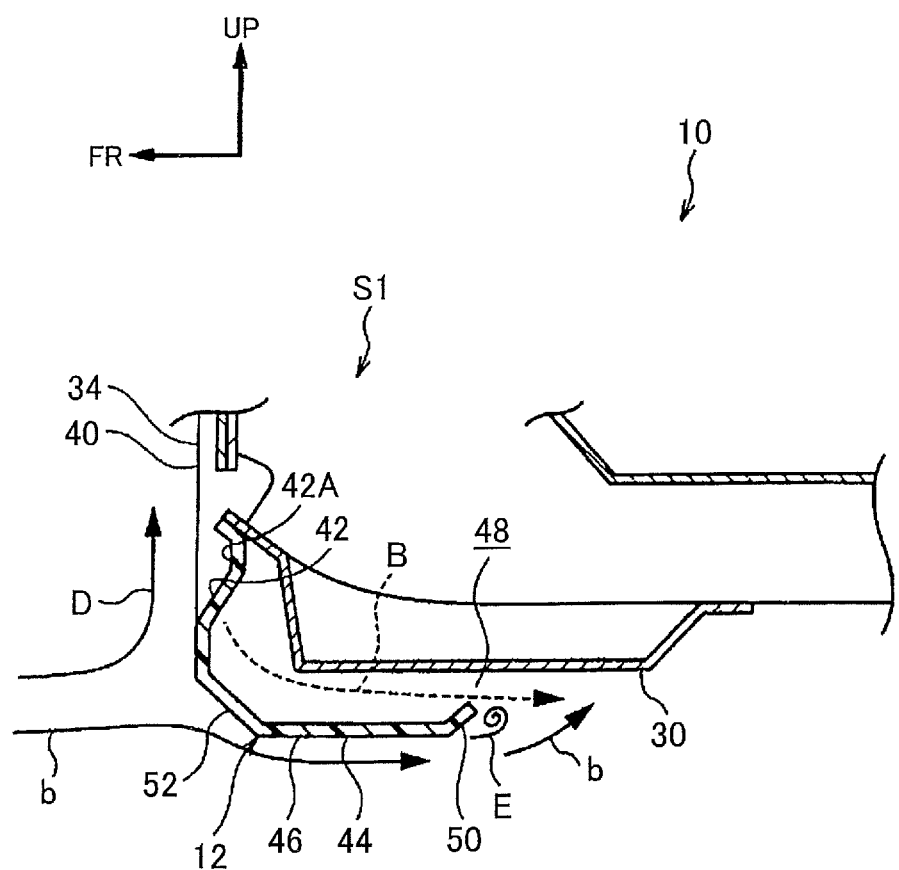
FIG. 6 is an enlarged cross-sectional view showing the rear portion of the fender liner shown in FIG. 1A, as viewed from the vehicle left side (a cross-sectional view taken along a line 6-6 of FIG. 1A).

Besides, as shown in FIG. 6, an opening rib 50 serving as "a protrusion portion" is formed integrally with the fender liner 12, which constitutes a lower edge portion of the opening portion 48 with respect to the vehicle. The opening rib 50 is arranged inclined upward with respect to the vehicle and backward with respect to the vehicle from the edge portion of the opening portion 48 in a lateral view.

Furthermore, a chamfer portion 52 serving as "an inclined portion" is formed on the bulge portion 46 of the fender liner 12. The chamfer portion 52 is arranged in front of the opening portion 48 with respect to the vehicle, is arranged inclined downward and backward with respect to the vehicle in a lateral view, and couples the arch portion 40 and the flange portion 44 of the bulge portion 46 to each other. Thus, part of a rear end portion of the wheel house 34 is constituted by the chamfer portion 52. Incidentally, a vehicle front lower-side corner portion of the torque box 30 that faces the chamfer portion 52 in a lateral view may be chamfered parallel to the chamfer portion 52.

Next, the operation and effect of the first embodiment of the invention will be described.

In the vehicle 10 configured as described above, the air flow passage 38 is formed between the fender liner 12 and the fender panel 36. The air flow passage 38 is held in communication with the front grill 22 by the communication passage 39. Then, during traveling of the vehicle 10, the air that has passed the front grill 22 backward with respect to the vehicle and the air that has passed the radiator 24 backward with respect to the vehicle flow toward the air flow passage 38 side via the communication passage 39. That is, an air current A flowing toward the air flow passage 38 side in the communication passage 39 is produced (see FIG. 2).

It should be noted herein that the opening portion 48 is formed behind the rear end portion of the arch portion 40 with respect to the vehicle, and that the opening portion 48 is held in communication with the air flow passage 38 and is opened backward with respect to the vehicle. Then, the air caused to flow into the air flow passage 38 during traveling of the vehicle 10 is discharged from the opening portion 48 to the space below the floor that is located behind the front wheel 32 with respect to the vehicle. That is, as shown in FIG. 3, an air current B flowing backward with respect to the vehicle is produced in the air flow passage 38. Then, the air current B passes between the front pillar 16 and the arch portion 40 (see FIG. 4), flows toward the bulge portion 46 side (see FIG. 5), and is discharged from the opening portion 48 backward with respect to the vehicle (see FIG. 6). Incidentally, regions surrounded by alternate long and two short dashes lines in FIG. 3 are described in a simplified manner to explain the air current B and regions of traveling winds a and b, which will be described later.

In this manner, the air current B flowing mainly backward with respect to the vehicle is produced in the air flow passage 38, so the air in the air flow passage 38 is restrained from being blown out toward the wheel house 34 side.

Besides, the opening portion 48 is opened backward with respect to the vehicle, so the air discharged from the opening portion 48 to the space below the floor that is located behind the front wheel 32 with respect to the vehicle flows backward with respect to the vehicle. That is, the air current B flows from the opening portion 48 backward with respect to the vehicle. Thus, as shown in FIG. 6, the orientation of the traveling wind b flowing from the wheel house 34 backward with respect to the vehicle below the opening portion 48 with respect to the vehicle substantially coincides with the orientation of the air current B discharged from the opening portion 48. Then, the air current B discharged from the opening portion 48 is discharged to a region of the traveling wind b with a relatively low flow rate behind the front wheel 32 with respect to the vehicle. Thus, in comparison with, for example, a case where the air in the air flow passage 38 is discharged from a hole through a lateral portion of the fender panel 36, the air in the air flow passage 38 is more efficiently discharged from the opening portion 48 while restraining a cd value (a coefficient of air resistance) from increasing.

On the other hand, if a hole is formed through a vehicle front region of the arch portion 40 of the fender liner 12, the air caused to flow into the air flow passage 38 may be blown out from the hole toward the wheel house 34 side. Thus, in this case, an air current C1 as shown in FIG. 7 may be produced.

Figure 8:
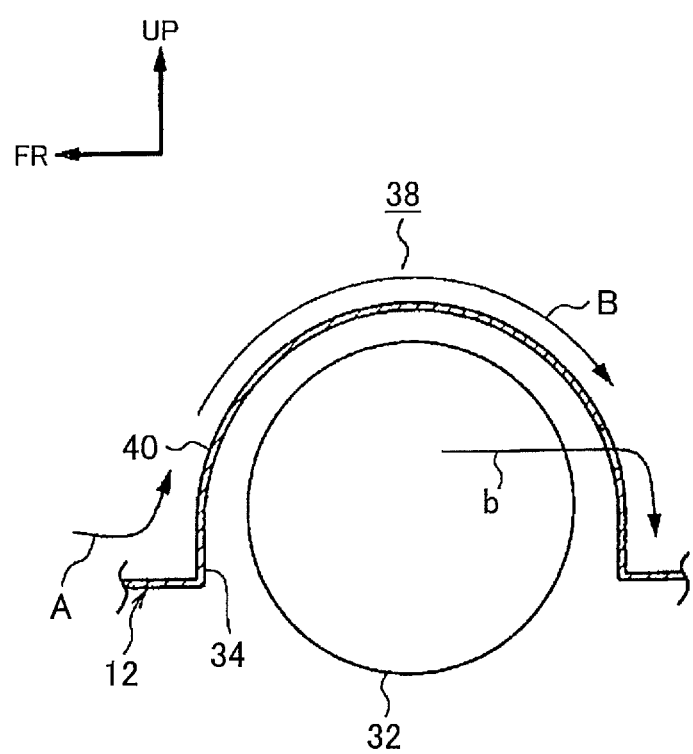
FIG. 8 is an illustrative view for illustrating the flow of air in another example in which a straightening hole is provided through the fender liner shown in FIG. 1A.

Besides, if a hole is formed through a vehicle rear region of the arch portion 40 of the fender liner 12 as shown in FIG. 8, the traveling wind in the wheel house 34 may be caused to flow into the air flow passage 38 from the hole. As a result, the pressure in the air flow passage 38 becomes high, and the air in the air flow passage 38 may tend to flow toward the wheel house 34 side. Thus, in this case, an air current C2 as shown in FIG. 3 may be produced.

Then, once produced, the air currents C1 and C2 flow from the wheel house 34 outward in the vehicle width direction, and may hit the traveling wind a flowing outside the wheel house 34 in the vehicle width direction. Thus, the traveling wind a becomes turbulent, so the operating stability of the vehicle 10 may deteriorate.

Figure 7:
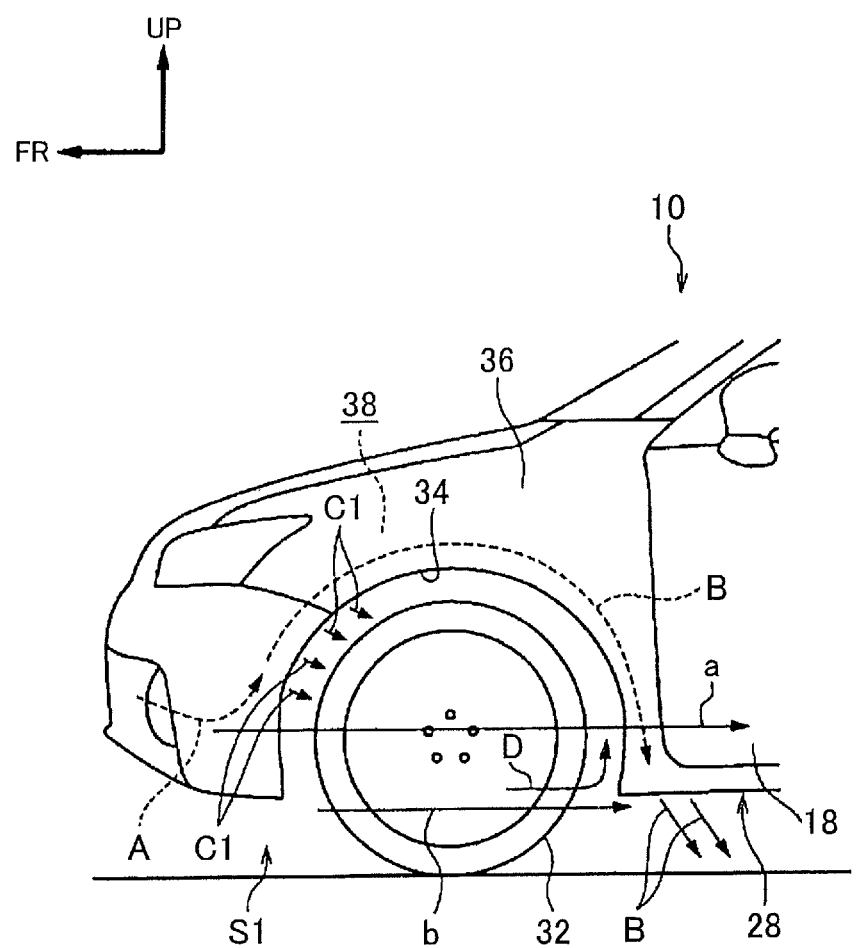
FIG. 7 is an illustrative view for illustrating the flow of air in an example in which a straightening hole is provided through the fender liner shown in FIG. 1A.

Furthermore, if the opening portion 48 is opened downward with respect to the vehicle instead of being opened backward with respect to the vehicle, the air current B flows from the opening portion 48 downward with respect to the vehicle as shown in FIG. 7. Thus, the air current B hits the traveling wind b flowing from the wheel house 34 backward with respect to the vehicle below the opening portion 48 with respect to the vehicle, so the traveling wind b becomes turbulent.

By contrast, in the vehicle 10 of the first embodiment of the invention, the air in the air flow passage 38 is restrained from being blown out toward the wheel house 34 side as described above, so the air currents C1 and C2 are restrained from hitting the traveling wind a as described above. Besides, in the vehicle 10, the air current B flows from the opening portion 48 backward with respect to the vehicle, so the air current B discharged from the opening portion 48 is restrained from hitting the traveling wind b. Thus, good operating stability of the vehicle 10 can be achieved.

Besides, in the vehicle 10, no hole through which the air caused to flow into the air flow passage 38 is blown out toward the wheel house 34 side is formed through the vehicle front region of the arch portion 40. Besides, no hole through which the air in the wheel house 34 is caused to flow into the air flow passage 38 is formed through the vehicle rear region of the arch portion 40. Accordingly, the air currents C1 and C2 can be effectively restrained from being produced as described above, so the operating stability of the vehicle 10 can be further improved.

Furthermore, as shown in FIG. 6, the chamfer portion 52 is formed in front of the opening portion 48 with respect to the vehicle. The chamfer portion 52 constitutes part of the rear end portion of the wheel house 34, and is inclined from the rear end portion of the arch portion 40 downward and backward with respect to the vehicle in a lateral view. Thus, upon hitting the chamfer portion 52 after flowing toward the chamfer portion 52 in the wheel house 34, the traveling wind b flows along the chamfer portion 52 and the flange portion 44 backward with respect to the vehicle.

On the other hand, if the fender liner 12 dispenses with the chamfer portion 52, an air current D flowing along the arch portion 40 upward with respect to the vehicle is produced when the traveling wind b hits the arch portion 40. Therefore, the air current becomes turbulent in the wheel house 34. Furthermore, the air current D is blown out from the wheel house 34 outward in the vehicle width direction, so the traveling wind of the vehicle 10 may become turbulent.

By contrast, the air current D is restrained from being produced as described above, and the air current in the wheel house 34 is restrained from becoming turbulent, by providing the fender liner 12 with the chamfer portion 52. Accordingly, the operating stability of the vehicle 10 can be further improved.

Besides, the opening rib 50 is formed at the edge portion of the opening portion 48 that is located on the lower side of the vehicle. The opening rib 50 is arranged inclined upward and backward with respect to the vehicle from the edge portion of the opening portion 48 in a lateral view. That is, the opening rib 50 is protruded from the edge portion of the opening portion 48 upward with respect to the vehicle. Thus, as shown in FIG. 6, the traveling wind b flowing along the flange portion 44 of the bulge portion 46 downward with respect to the vehicle is detached by the opening rib 50, and a leftward air swirl E as viewed from the left side of the vehicle (counterclockwise) is produced behind the opening rib 50 with respect to the vehicle. Then, the traveling wind b is drawn in upward with respect to the vehicle by this air swirl E. Thus, the air discharged from the opening portion 48 by the traveling wind b thus drawn in can be efficiently caused to flow backward with respect to the vehicle.

Furthermore, the arch portion 40 is formed in a convexo-concave shape in a cross-sectional view as viewed from the circumferential direction of the arch portion 40. This convexo-concave region is extended in the circumferential direction of the arch portion 40. Therefore, part of the air current B in the air flow passage 38 tends to flow along the circumferential direction of the arch portion 40, which assumes the convexo-concave shape. Therefore, the air in the air flow passage 38 can be further restrained from being blown out toward the wheel house 34 side.

(Second Embodiment)

A vehicle 100 to which a vehicle body front structure S2 according to the second embodiment of the invention is applied will be described using FIGS. 9 to 11. This vehicle 100 is configured in the same manner as the vehicle 10 of the first embodiment of the invention except in the following respects. The following description will be given with the members configured in the same manner as those of the vehicle 10 denoted by the same reference symbols respectively.

Figure 11:
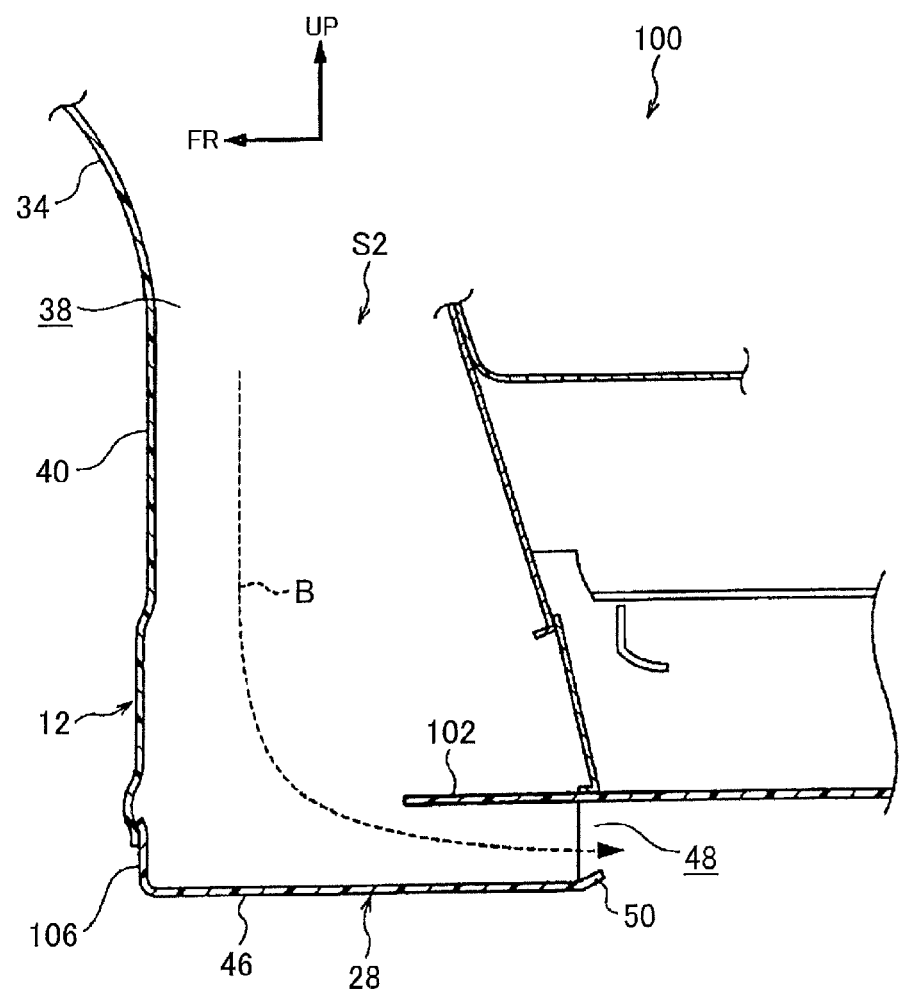
FIG. 11 is a cross-sectional view of the rear portion of the fender liner shown in FIG. 10, as viewed from a vehicle left side (a cross-sectional view taken along a line 11-11 of FIG. 9).

As shown in FIG. 11, in the vehicle 100, the flange portion 44 of the fender liner 12 is dispensed with. Then, the front end portion of the rocker molding 28 is arranged below the rear end portion of the arch portion 40 with respect to the vehicle, and is caused to bulge from the rear end portion of the arch portion 40 downward with respect to the vehicle. Thus, the vehicle front region of the rocker molding 28 serves as the bulge portion 46. The opening portion 48 is formed through this bulge portion 46.

Figure 9:
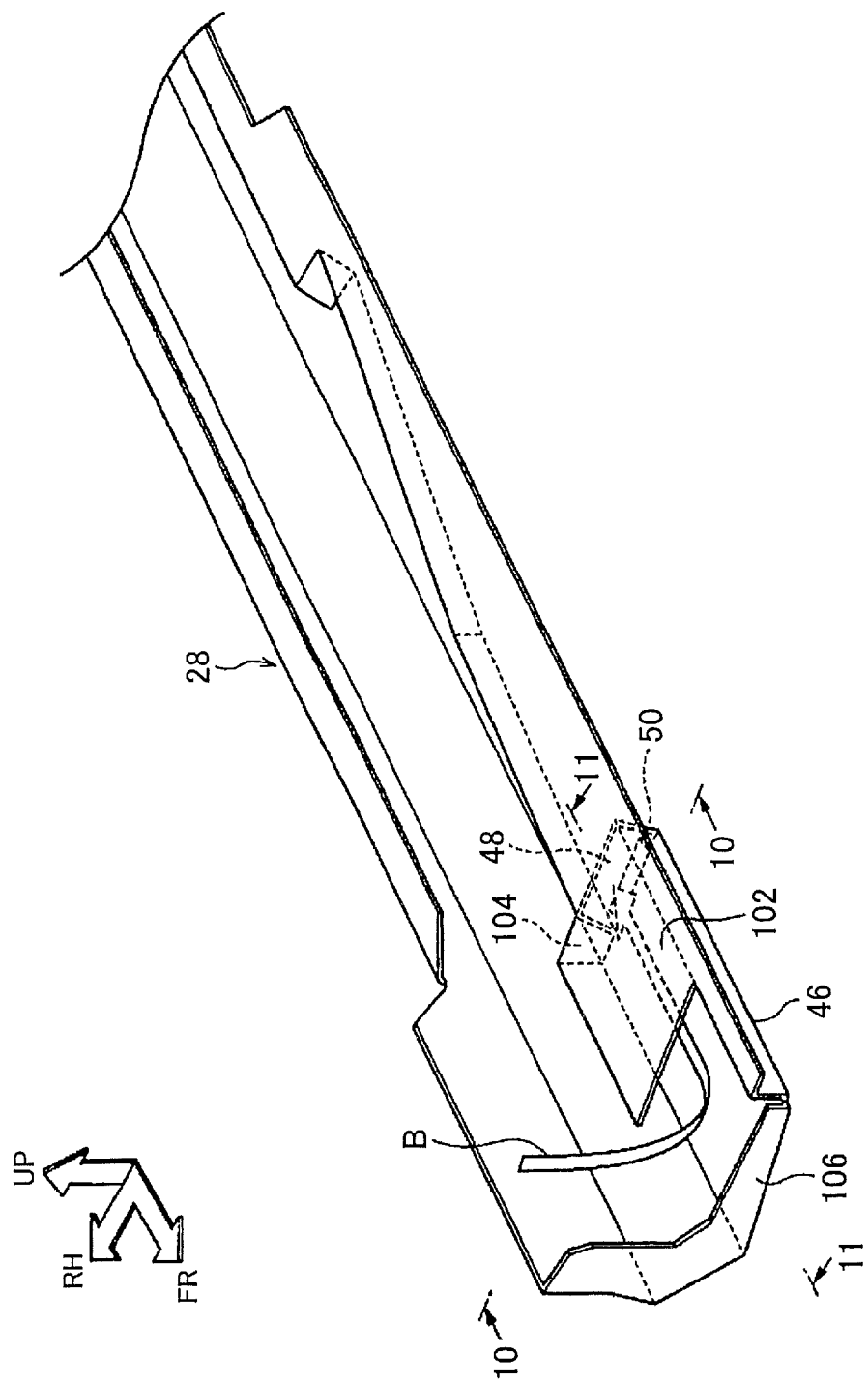
FIG. 9 is a perspective view showing a rocker molding that is employed for a vehicle body front structure according to a second embodiment of the invention, as viewed from a point diagonally in front of and on the left of a vehicle.
Figure 10:
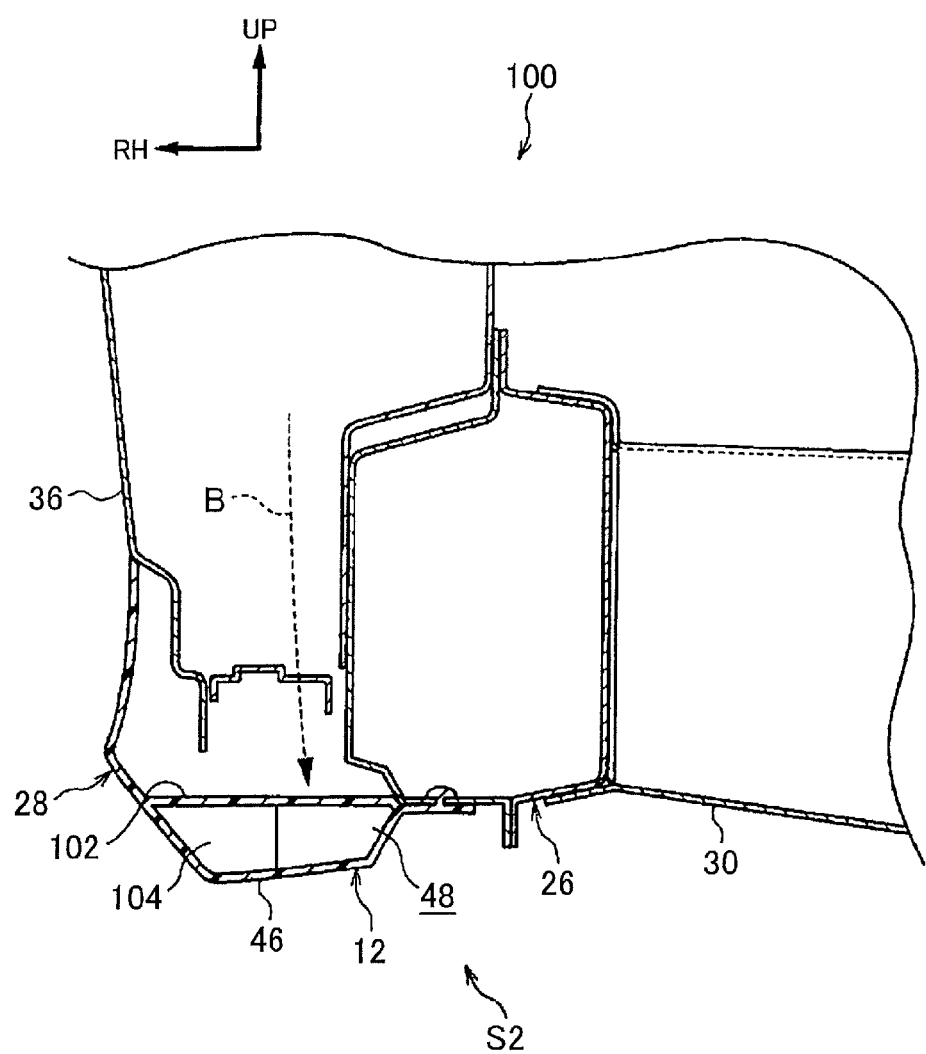
FIG. 10 is a cross-sectional view showing a rear portion of a fender liner that is employed for the vehicle body front structure according to the second embodiment of the invention, as viewed from a vehicle front side (a cross-sectional view taken along a line 10-10 of FIG. 9).

As shown in FIGS. 9 and 10, the bulge portion 46 of the rocker molding 28 is formed with a substantially L-shaped cross-section as viewed from a point in front of the vehicle, and the inner end portion of this bulge portion 46 in the vehicle width direction is flexed upward with respect to the vehicle. Besides, a cylindrical portion 102 that substantially assumes the shape of a rectangular cylinder and that is opened in the vehicle longitudinal direction is formed in the vehicle rear region of the bulge portion 46. An opening wall 104 is formed on the rear end portion of this cylindrical portion 102. This opening wall 104 is arranged along a direction substantially perpendicular to the vehicle longitudinal direction. The opening portion 48 that is opened backward with respect to the vehicle is formed through an inner region of the opening wall 104 with respect to the vehicle. Besides, a front lateral wall 106 is formed integrally with a front end portion of the rocker molding 28. The front lateral wall 106 is arranged along the direction substantially perpendicular to the vehicle longitudinal direction. The rear end of the arch portion 40 of the fender liner 12 is arranged on the vehicle upper side of the front lateral wall 106. Then, the opening portion 48 is held in communication with the air flow passage 38 via the cylindrical portion 102. Incidentally, in the second embodiment of the invention, the bulge portion 46 dispenses with the chamfer portion 52. However, the chamfer portion 52 may be formed at a lower end of the front lateral wall 106.

Then, during traveling of the vehicle 100, the air caused to flow into the air flow passage 38 flows backward with respect to the vehicle in the air flow passage 38, and the air current B is produced in the air flow passage 38. Furthermore, the air current B passes the interior of the cylindrical portion 102 of the rocker molding 28, and flows from the opening portion 48 backward with respect to the vehicle. Accordingly, the vehicle 100 in the second embodiment of the invention also achieves an operation and an effect similar to those of the first embodiment of the invention.

Besides, in the second embodiment of the invention, the opening portion 48 is provided through the rocker molding 28, so good operating stability of the vehicle can be achieved with the aid of the rocker molding 28.

(Third Embodiment)

A vehicle 200 to which a vehicle body front structure S3 according to the third embodiment of the invention is applied will be described using FIGS. 12 to 14. This vehicle 200 is configured in the same manner as the vehicle 10 of the first embodiment of the invention, except in the following respects. The following description will be given with the members configured in the same manner as those of the vehicle 10 denoted by the same reference symbols respectively.

Figure 12:
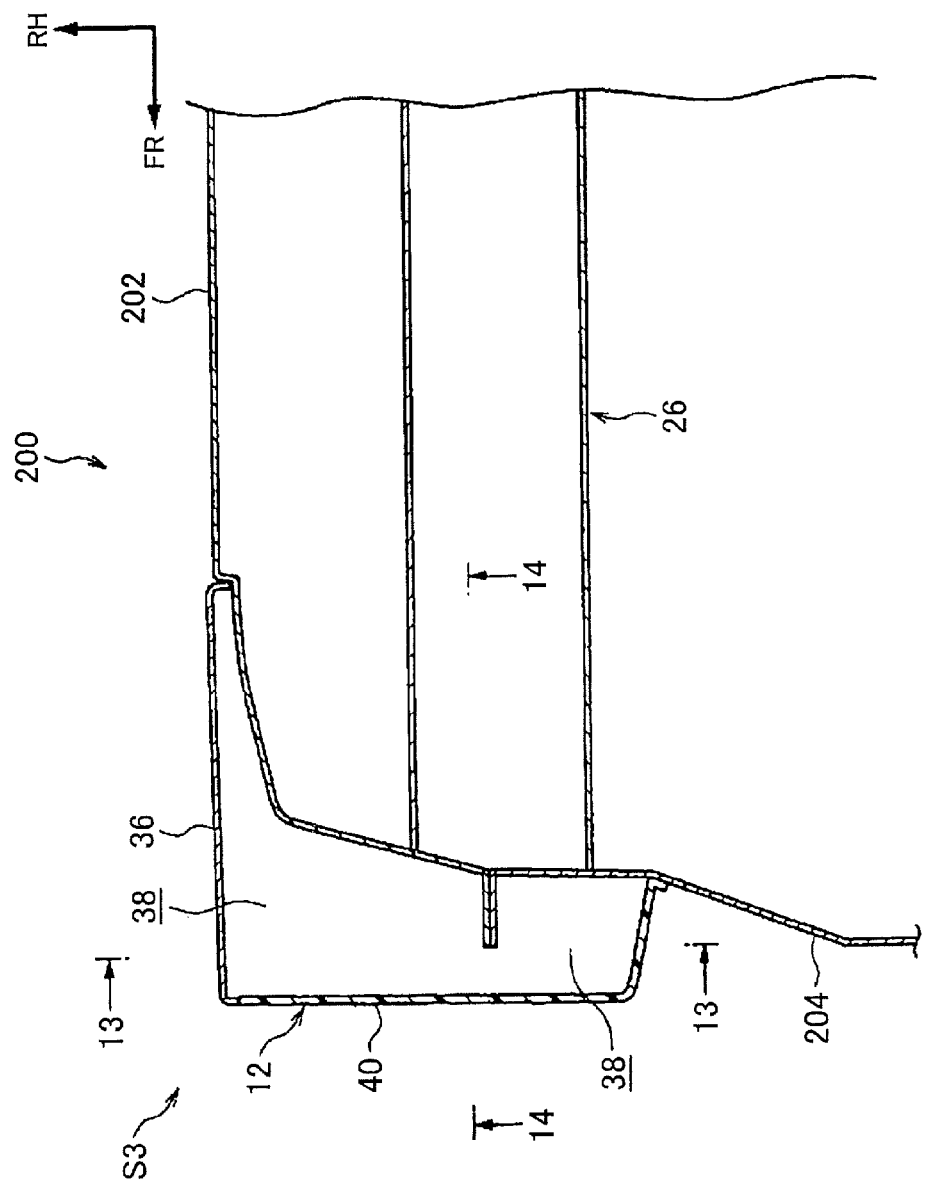
FIG. 12 is a cross-sectional view showing a rear portion of a fender liner that is employed for a vehicle body front structure according to a third embodiment of the invention, as viewed from above a vehicle.
Figure 13:
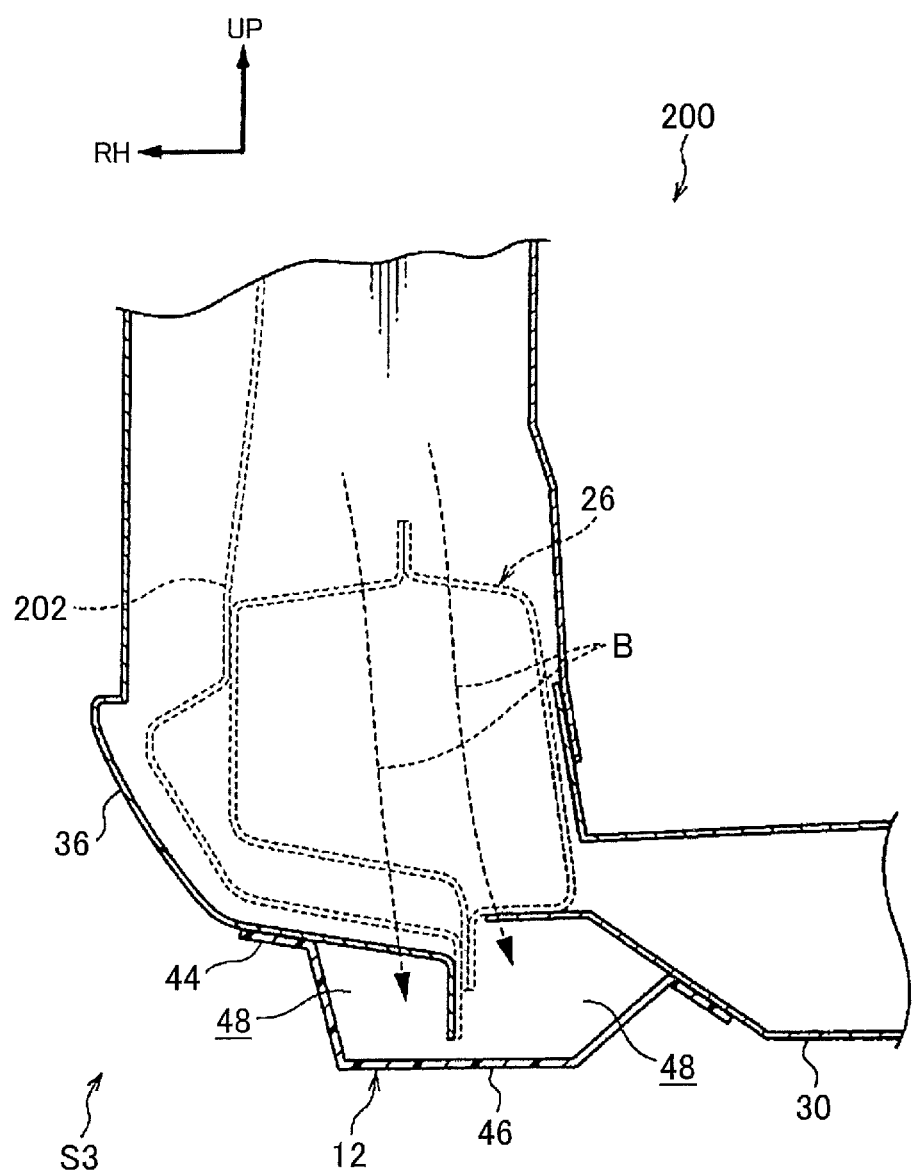
FIG. 13 is a cross-sectional view of the rear portion of the fender liner shown in FIG. 12, as viewed from a vehicle front side (a cross-sectional view taken along a line 13-13 of FIG. 12).

As shown in FIGS. 12 and 13, in the vehicle 200, the rocker molding 28 in the first embodiment of the invention is dispensed with, and the rocker 26 is covered with a side outer panel 202. A front end portion of this side outer panel 202 is linked with an outer end portion of a dash panel 204 in the vehicle width direction.

Figure 14:
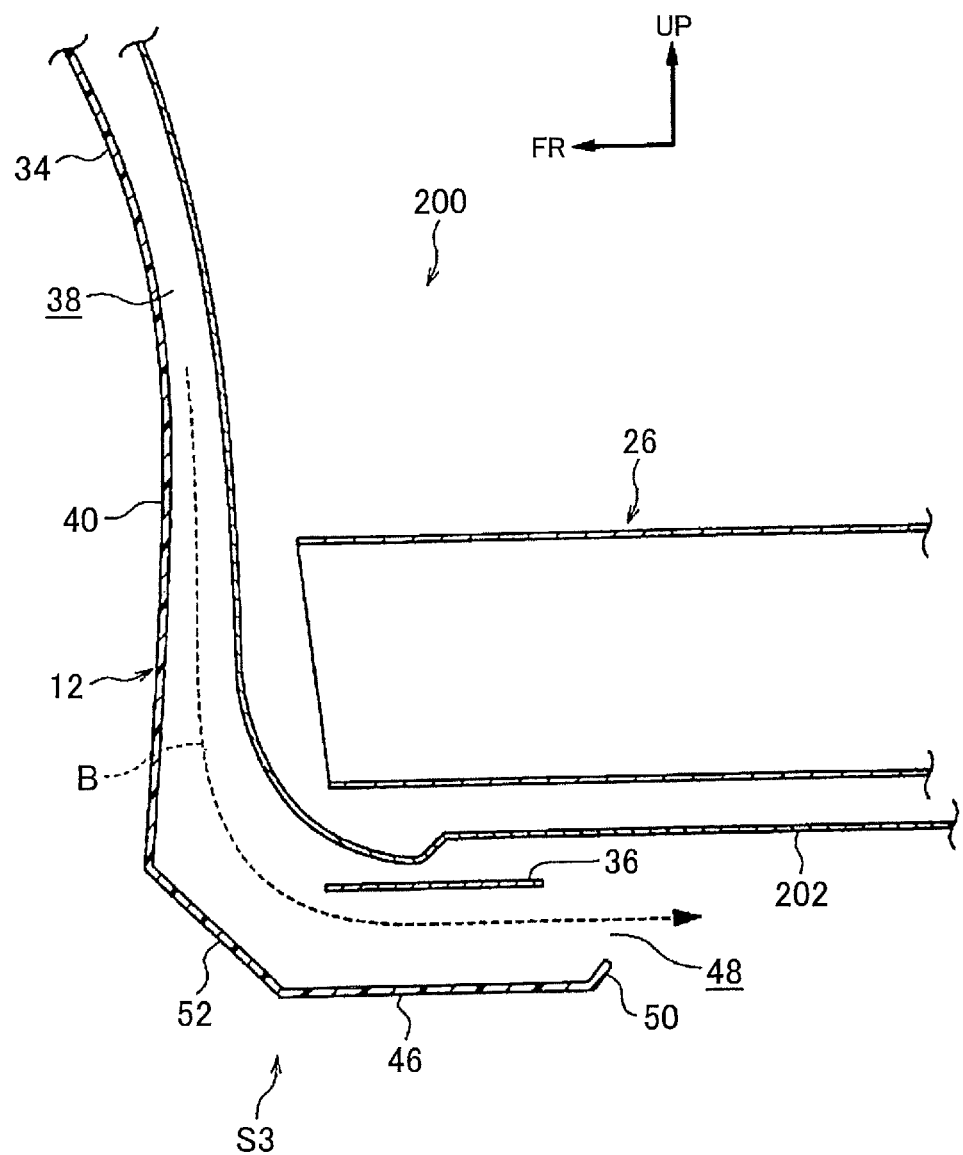
FIG. 14 is a cross-sectional view of the rear portion of the fender liner shown in FIG. 12, as viewed from a vehicle left side (a cross-sectional view taken along a line 14-14 of FIG. 12).

As shown in FIGS. 13 and 14, the lower end portion of the fender panel 36 extends to a point below the rocker 26 with respect to the vehicle. Besides, the fender liner 12 dispenses with the attachment strip 42. The bulge portion 46 of the fender liner 12 is coupled to the arch portion 40, and is arranged below the fender panel 36 and the torque box 30 with respect to the vehicle (see FIG. 13). Thus, the opening portion 48 is constituted by the fender liner 12, the fender panel 36, and the torque box 30. The opening portion 48 is held in communication with the air flow passage 38 via the bulge portion 46.

Then, during traveling of the vehicle 200, the air caused to flow into the air flow passage 38 flows backward with respect to the vehicle in the air flow passage 38, and the air current B is produced in the air flow passage 38. Furthermore, the air current B flows from the opening portion 48 backward with respect to the vehicle via the bulge portion 46. Accordingly, the vehicle 200 in the third embodiment of the invention also achieves an operation and an effect similar to those of the first embodiment of the invention.

(Fourth Embodiment)

A vehicle 300 to which a vehicle body front structure S4 according to the fourth embodiment of the invention is applied will be described using FIGS. 15 and 16. This vehicle 300 is configured in the same manner as the vehicle 10 of the first embodiment of the invention, except in the following respects. The following description will be given with the members configured in the same manner as those of the vehicle 10 denoted by the same reference symbols respectively.

Figure 15:
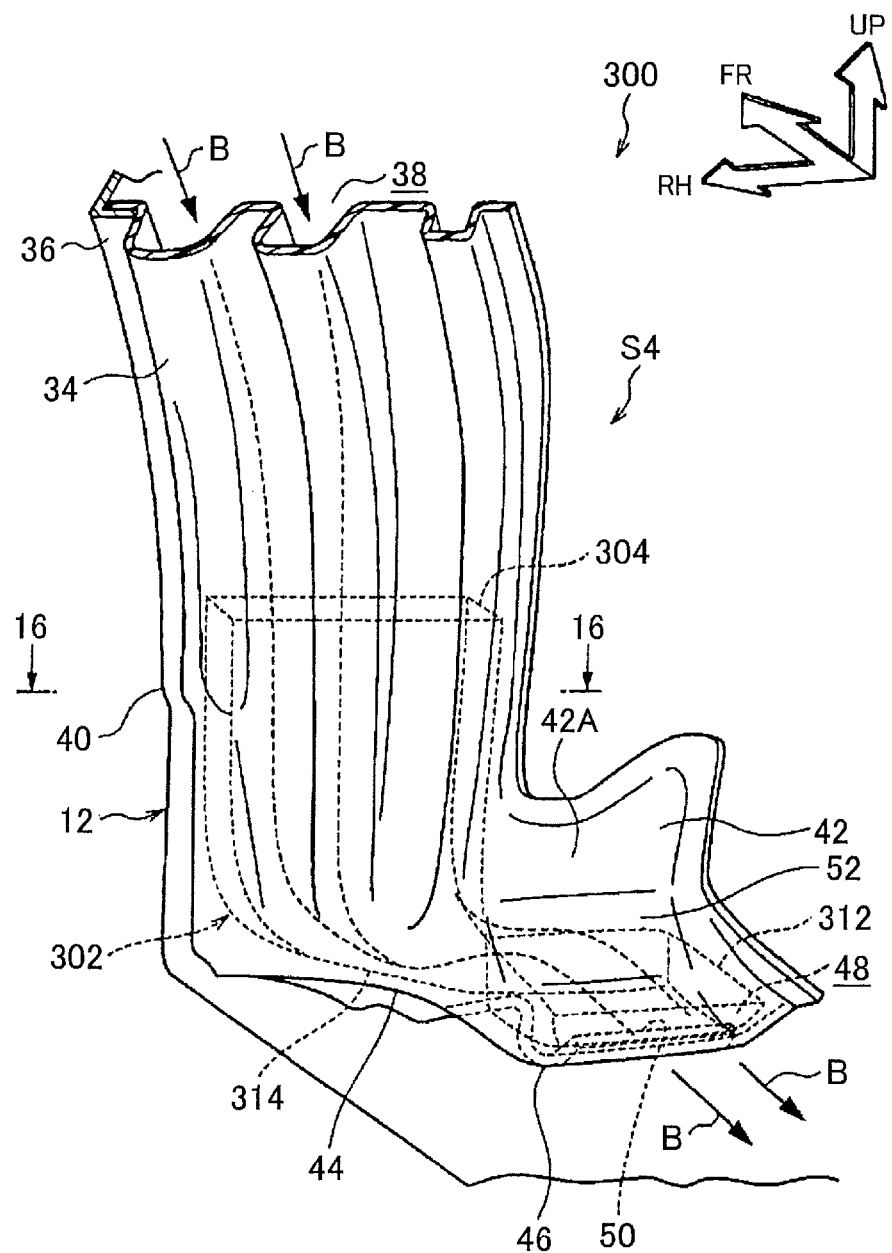
FIG. 15 is a partially broken perspective view showing a duct that is employed for a vehicle body front structure according to a fourth embodiment of the invention, as viewed from a point diagonally in front of and below a vehicle.
Figure 16:
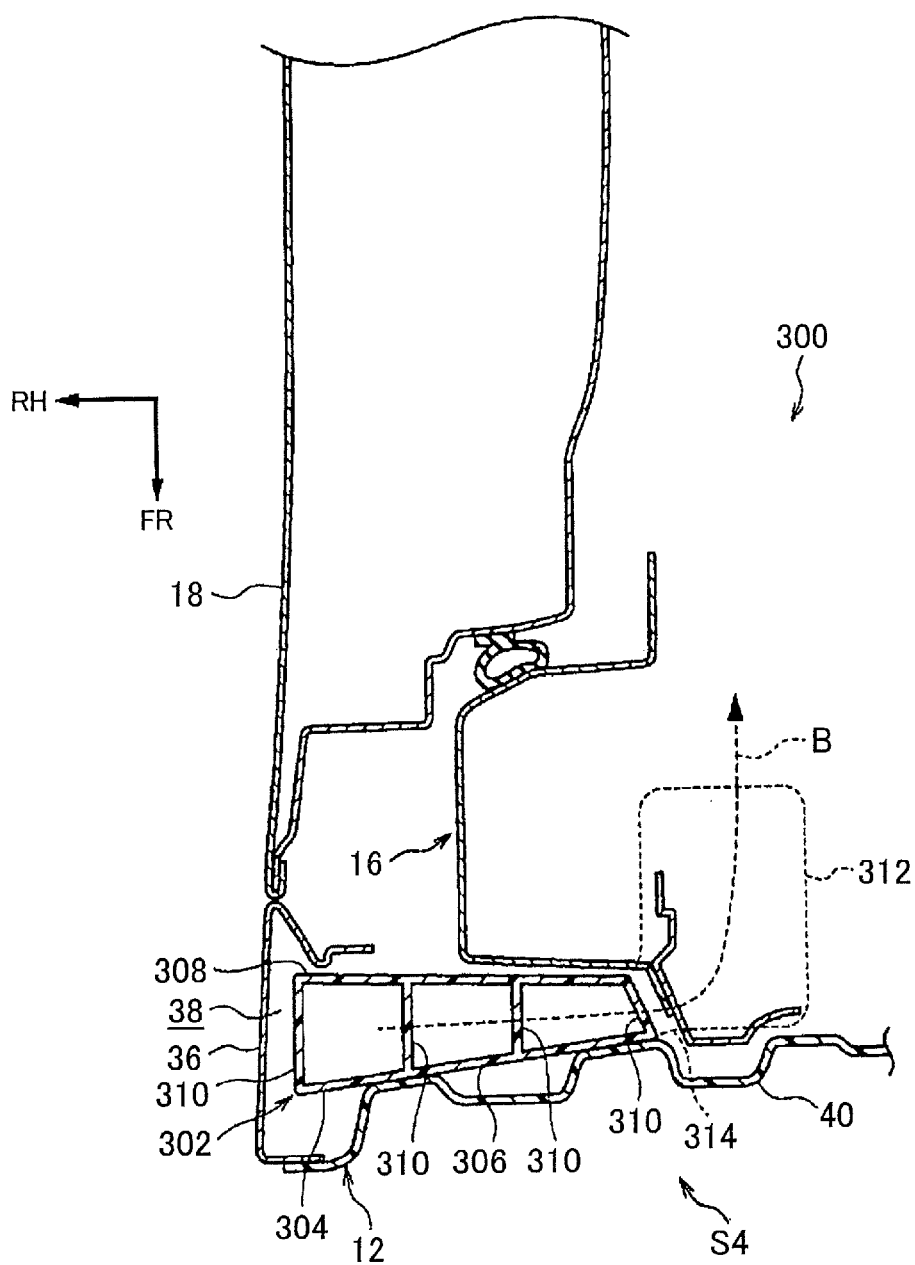
FIG. 16 is a cross-sectional view of the duct shown in FIG. 15, as viewed from above the vehicle (a cross-sectional view taken along a line 16-16 of FIG. 15).

As shown in FIG. 15, in the vehicle 300, the vehicle rear region of the arch portion 40 of the fender liner 12 is provided with a duct 302 serving as "a guide portion". This duct 302 is manufactured from a fiber-reinforced resin as "a fiber-reinforced composite material" containing, for example, carbon fiber, glass fiber, metallic fiber or the like. Besides, the duct 302 is configured to include a duct body portion 304 that is arranged behind the arch portion 40 with respect to the vehicle, a duct discharge portion 312 that is arranged in the bulge portion 46, and a duct coupling portion 314 that couples the duct body portion 304 and the duct discharge portion 312 to each other.

The duct body portion 304 is formed substantially in the shape of a rectangular cylinder with its longitudinal direction coinciding with the vehicle vertical direction. Then, as shown in FIG. 16, a front wall 306 of the duct body portion 304 is linked with the arch portion 40 by a fastening member (not shown) such as a rivet or the like. The front wall 306 and a rear wall 308 of this duct body portion 304 are coupled to each other by a plurality of (four in the present embodiment of the invention) guide ribs 310 serving as "guide walls". The guide ribs 310 are aligned with one another in the vehicle width direction. Each of the guide ribs 310, except the guide rib 310 that is arranged inside in the vehicle width direction, extends in the vehicle longitudinal direction in a plan view. Besides, the guide rib 310 that is arranged inside in the vehicle width direction is arranged inclined outward in the vehicle width direction and backward with respect to the vehicle in a plan view. Incidentally, this guide rib 310 that is arranged inside in the vehicle width direction may be arranged along the vehicle longitudinal direction as viewed from the vehicle upper side, as is the case with the other guide ribs 310. Besides, the respective guide ribs 310 extend along the longitudinal direction of the duct body portion 304 (along the vehicle vertical direction).

As shown in FIG. 15, the duct discharge portion 312 is formed substantially in the shape of a rectangular cylinder with its longitudinal direction coinciding with the vehicle longitudinal direction. A rear end portion of the duct discharge portion 312 is arranged in front of the opening portion 48 with respect to the vehicle. Besides, the duct coupling portion 314 is substantially cylindrically formed, and holds the duct body portion 304 and the duct discharge portion 312 in communication with each other. Thus, the opening portion 48 and the air flow passage 38 are held in communication with each other via the duct 302.

Then, during traveling of the vehicle 300, the air caused to flow into the air flow passage 38 flows backward with respect to the vehicle in the air flow passage 38, and the air current B is produced in the air flow passage 38. This air current B is straightened by the guide ribs 310 of the duct 302, and flows toward the rear end portion of the arch portion 40 (downward with respect to the vehicle). Furthermore, the air current B is guided (introduced) to the opening portion 48 by the duct 302, and is discharged from the opening portion 48 backward with respect to the vehicle. Accordingly, the fourth embodiment of the invention also achieves an operation and an effect similar to those of the first embodiment of the invention.

Besides, in the fourth embodiment of the invention, the duct 302 is provided behind the arch portion 40 with respect to the vehicle, and the air current B in the air flow passage 38 is guided toward the opening portion 48 side by the duct 302. Therefore, the air current B in the air flow passage 38 can be efficiently introduced to the opening portion 48.

Furthermore, the duct 302 is manufactured from a fiber-reinforced resin. Besides, the duct body portion 304 is provided integrally with the guide ribs 310. The guide ribs 310 extend in the vehicle longitudinal direction in a plan view. Thus, the collision load input to the vehicle 300 can be absorbed by the guide ribs 310 in the event of, for example, a minimum wrap collision of the vehicle 300 (when the vehicle 300 collides head-on with a collision body such as an oncoming vehicle or the like outside the front side member in the vehicle width direction).

(Modification Example of Fourth Embodiment)

Figure 17:
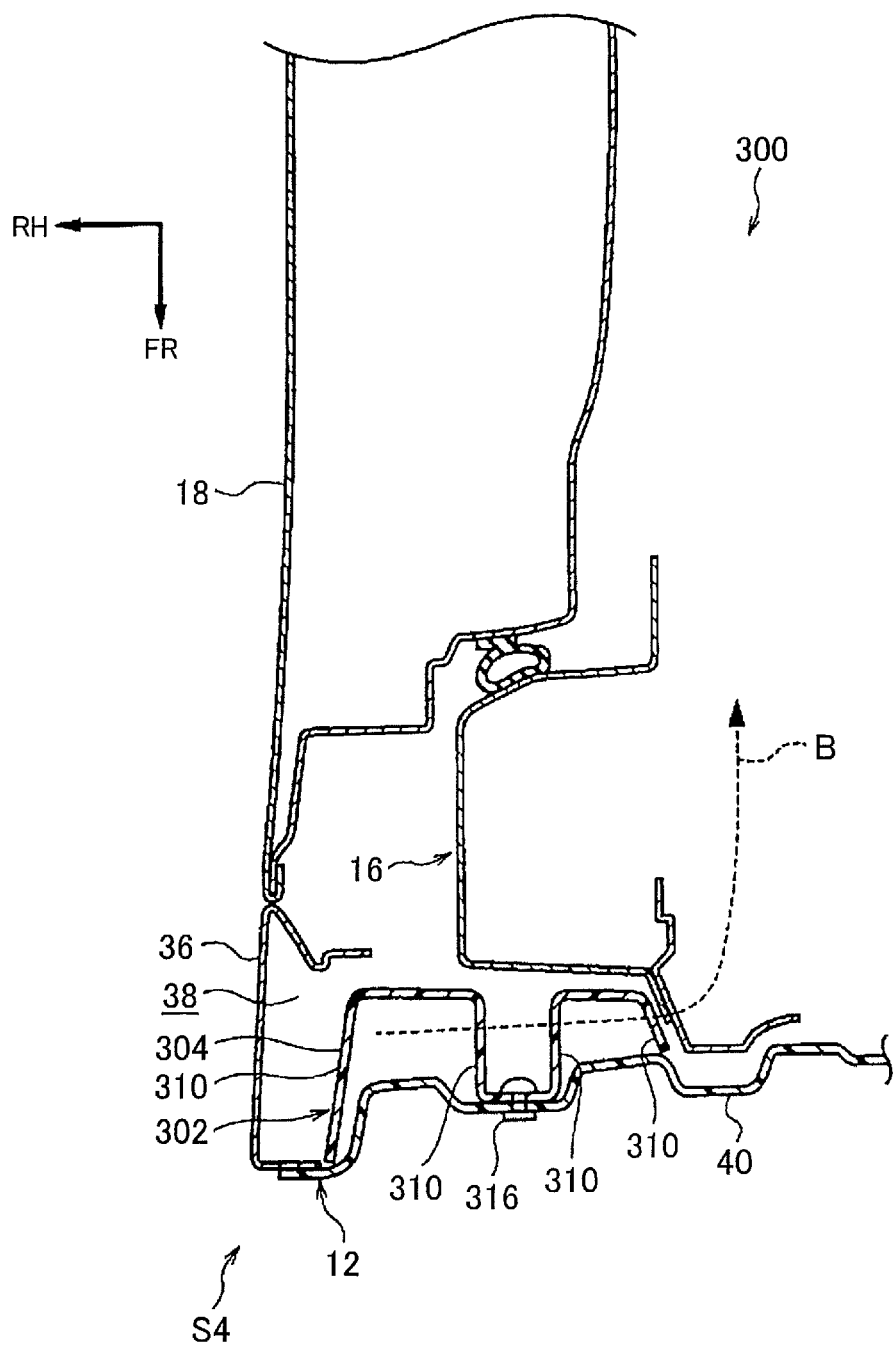
FIG. 17 is a cross-sectional view of the duct that is employed for the vehicle body front structure according to the fourth embodiment of the invention, as viewed from above the vehicle.

As shown in FIG. 17, in a modification example of the fourth embodiment of the invention, the duct discharge portion 312 and the duct coupling portion 314 of the duct 302 are dispensed with. Then, the duct body portion 304 is formed in the shape of a plate, and is flexed in a convexo-concave shape as viewed from the vehicle upper side. More specifically, both end portions of the duct body portion 304 in the vehicle width direction are flexed forward with respect to the vehicle, and the guide ribs 310 are formed on both lateral portions of the duct 302 in the vehicle width direction respectively. Besides, a substantially central portion of the duct body portion 304 in the vehicle width direction is protruded forward with respect to the vehicle, and is formed in the shape of a recess that is opened backward with respect to the vehicle. Thus, the guide ribs 310 are formed at an intermediate portion of the duct body portion 304 in the vehicle width direction. Besides, a substantially central portion of the duct 302 in the vehicle width direction is linked with the arch portion 40 by a fastening member such as a rivet 316 or the like.

Then, during traveling of the vehicle 300, the air caused to flow into the air flow passage 38 flows backward with respect to the vehicle in the air flow passage 38, and the air current B is produced in the air flow passage 38. This air current B is straightened by the guide ribs 310 of the duct 302, and flows toward the rear end portion of the arch portion 40 (downward with respect to the vehicle). Furthermore, the air current B is guided toward the bulge portion 46 side by the duct 302, and is discharged from the opening portion 48 backward with respect to the vehicle. Accordingly, this modification example also achieves an operation and an effect similar to those of the first embodiment of the invention.

Incidentally, in the fourth embodiment of the invention and the modification example thereof, the duct 302 is applied to the vehicle 10 of the first embodiment of the invention. However, the duct 302 may be applied to the vehicle 100 of the second embodiment of the invention and the vehicle 200 of the third embodiment of the invention. In this case, the shape of the duct 302 may be appropriately changed in a manner corresponding to the vehicle 100 and the vehicle 200. For example, the duct 302 of the fourth embodiment of the invention may dispense with the duct discharge portion 312 and the duct coupling portion 314, and then may be applied to the vehicle 100 and the vehicle 200.

Furthermore, in the fourth embodiment of the invention and the modification example thereof, the duct 302 and the fender liner 12 are configured separately from each other. However, the duct 302 and the fender liner 12 may be configured integrally with each other. In this case, the duct 302 and the fender liner 12 may be manufactured from a resin that does not contain carbon fiber or the like.

Furthermore, in the fourth embodiment of the invention and the modification example thereof, the duct 302 is fastened to the fender liner 12 by the fastening member. However, the duct 302 may be fastened to a member constituting a skeleton of the vehicle (e.g., the front pillar 16).

Figure 18A:
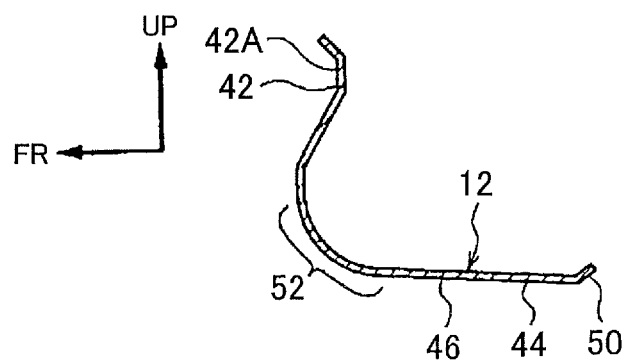
FIG. 18A is a cross-sectional view showing a case where a chamfer portion of the fender liner in each of the first to fourth embodiments of the invention is formed in the shape of a circular arc in a lateral view.
Figure 18B:
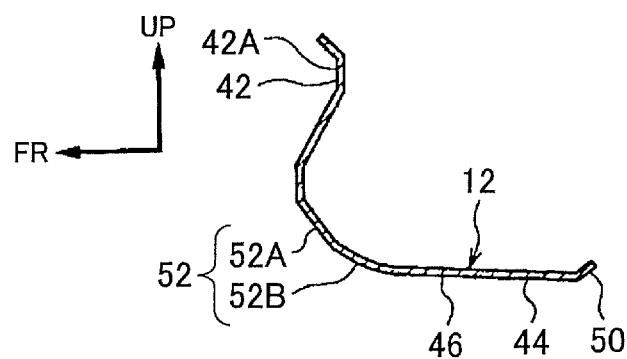
FIG. 18B is a cross-sectional view showing an exemplary case where the chamfer portion of the fender liner in each of the first to fourth embodiments of the invention is constituted of a plurality of chamfer portions.
Figure 18C:
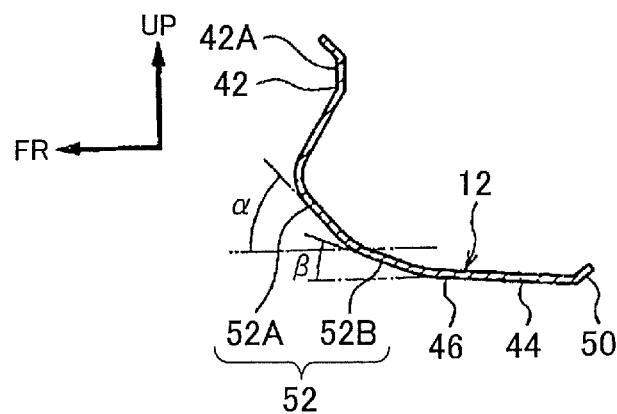
FIG. 18C is a cross-sectional view showing another exemplary case where the chamfer portion of the fender liner in each of the first to fourth embodiments of the invention is constituted of a plurality of chamfer portions.
Figure 18D:
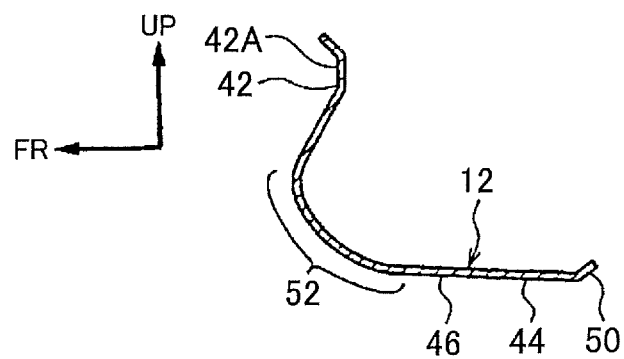
FIG. 18D is a cross-sectional view showing a case where the curvature radius of the chamfer portion of the fender liner in each of the first to fourth embodiments of the invention is changed.

Furthermore, in the first to fourth embodiments of the invention and the modification example of the fourth embodiment of the invention, the chamfer portion 52 is arranged inclined downward with respect to the vehicle and backward with respect to the vehicle in a lateral view, but the shape of the chamfer portion 52 is not limited thereto. For example, as shown in FIG. 18A, the chamfer portion 52 may be curved in the shape of a circular arc with a certain radius, which is protruded diagonally forward and downward with respect to the vehicle in a lateral view. Besides, as shown in FIGS. 18B and 18C, the chamfer portion 52 may be constituted of a plurality of (two in FIGS. 18B and 18C) chamfer portions (hereinafter referred to as "divided chamfer portions"). For example, as shown in FIG. 18B, a divided chamfer portion 52A that constitutes an upper portion of the chamfer portion 52 may be linearly inclined downward and backward with respect to the vehicle in a lateral view, and a divided chamfer portion 52B that constitutes a lower portion of the chamfer portion 52 may be curved in the shape of a circular arc that is protruded diagonally forward and downward with respect to the vehicle. Besides, as shown in FIG. 18C, the divided chamfer portion 52A that constitutes the upper portion of the chamfer portion 52, and the divided chamfer portion 52B that constitutes the lower portion of the chamfer portion 52 may be linearly inclined downward and backward with respect to the vehicle in a lateral view, and an angle α of the divided chamfer portion 52A with respect to the vehicle longitudinal direction may be set larger than an angle β of the divided chamfer portion 52A with respect to the vehicle longitudinal direction. That is, in an example shown in FIG. 18C, in the case where the chamfer portion 52 is constituted of three or more divided chamfer portions, the lower each of the divided chamfer portions is arranged, the smaller the angle thereof with respect to the vehicle longitudinal direction is set. Furthermore, as shown in FIG. 18D, the upper end of the chamfer portion 52 may be arranged higher than in FIG. 18A with respect to the vehicle, the chamfer portion 52 may be curved in the shape of a circular arc that is protruded forward and diagonally downward with respect to the vehicle in a lateral view, and the curvature radius of the chamfer portion 52 may be set in such a manner as to increase in a direction downward with respect to the vehicle.

Besides, in the first to fourth embodiments of the invention and the modification example of the fourth embodiment of the invention, the opening rib 50 is arranged inclined upward and backward with respect to the vehicle in a lateral view, but the shape of the opening rib 50 is not limited thereto. For example, the edge portion of the opening portion 48 may be flexed upward with respect to the vehicle to form the opening rib 50. Besides, a tip portion (an end portion on the rear side of the vehicle) of the opening rib 50 may be flexed backward with respect to the vehicle in a lateral view, so that the opening rib 50 is formed in a staircase pattern. That is, the opening rib 50 may be formed in such a manner as to produce the swirl E for drawing in the traveling wind b toward the opening portion 48 side.

Furthermore, in the first to fourth embodiments of the invention and the modification example of the fourth embodiment of the invention, a deflection rib for changing the orientation of the air current B discharged from the opening portion 48 in a manner corresponding to the orientation of the traveling wind flowing around the opening portion 48 may be provided in front of the opening portion 48 with respect to the vehicle. A description will be given on this point, using the first embodiment of the invention. That is, for example, a deflection rib that is inclined inward in the vehicle width direction and backward with respect to the vehicle in a plan view may be formed on an inner lateral face of the bulge portion 46, such that the orientation of the air current B discharged from the opening portion 48 coincides with the orientation of the traveling wind flowing around the opening portion 48.

Besides, in the first, third and fourth embodiments of the invention and the modification example of the fourth embodiment of the invention, the chamfer portion 52 is formed on the fender liner 12. However, the fender liner 12 may dispense with the chamfer portion 52.

Furthermore, in the first to fourth embodiments of the invention and the modification example of the fourth embodiment of the invention, the opening rib 50 is formed on the edge portion of the opening portion 48. However, the opening portion 48 may dispense with the opening rib 50.

Besides, in the first to fourth embodiments of the invention and the modification example of the fourth embodiment of the invention, no hole through which the air caused to flow into the air flow passage 38 is blown out toward the wheel house 34 side is formed through the vehicle front region of the arch portion 40. Besides, no hole through which the air in the wheel house 34 is caused to flow into the air flow passage 38 is formed through the vehicle rear region of the arch portion 40. Instead, as long as the operation and effect of the invention (that good operating stability of the vehicle is achieved by discharging the air in the air flow passage 38 from the opening portion 48 to the space below the floor that is located behind the front wheel 32 with respect to the vehicle backward with respect to the vehicle) are obtained, a hole may be formed through the arch portion 40. It should be noted, however, that if a hole is formed through the arch portion 40 as described above, the air currents C1 and C2 flowing from inside the air flow passage 38 toward the wheel house 34 side may be produced. It is therefore preferable that no hole be formed through the arch portion 40.

The invention claimed is:

1. A vehicle body front structure comprising:
   a fender liner that is provided in a wheel house in which a front wheel is arranged, that has an arch portion covering an upper portion of the front wheel from a vehicle upper side, and that forms an air flow passage between the arch portion and a fender;
   a communication passage through which a front grill that is provided at a vehicle front portion and the air flow passage communicate with each other; and
   an opening portion that is provided in a vehicle longitudinal direction back side of a rear end portion of the arch portion, that is held in communication with the air flow passage, that is opened backward with respect to the vehicle, and that discharges air caused to flow into the air flow passage to a space below a floor that is located in a vehicle longitudinal direction back side of the front wheel, the air flowing into the air flow passage from a front side than a front end of the air flow passage in the vehicle longitudinal direction.

2. The vehicle body front structure according to claim 1, wherein
   no hole for causing air to flow into the air flow passage from inside the wheel house is formed through the arch portion.

3. The vehicle body front structure according to claim 1, wherein
   an inclined portion is provided in a vehicle longitudinal direction front side of the opening portion, and
   the inclined portion constitutes part of a rear end portion of the wheel house, and is inclined backward and downward with respect to the vehicle in a lateral view.

4. The vehicle body front structure according to claim 1, wherein
   a protrusion portion that is protruded upward with respect to the vehicle is formed on an edge portion of a vehicle vertical direction lower side of the opening portion.

5. The vehicle body front structure according to claim 1, further comprising:
   a rocker that is provided at a lower portion of the vehicle and a vehicle longitudinal direction back side of the fender liner; and
   a rocker molding that covers the rocker, wherein
   the opening portion is formed through the rocker molding.

6. The vehicle body front structure according to claim 1, wherein
   a guide portion that guides air in the air flow passage to the opening portion side and that is provided in a vehicle longitudinal direction back side of the arch portion.

7. The vehicle body front structure according to claim 6, wherein
   a guide wall that extends in a vehicle longitudinal direction in a plan view is formed on the guide portion, and
   the guide wall is manufactured from a fiber-reinforced composite material.

8. The vehicle body front structure according to claim 1, wherein
   the arch portion is formed in a convexo-concave shape in a cross-sectional view as viewed from a circumferential direction of the arch portion.

* * * * *